(12) United States Patent
Kim et al.

(10) Patent No.: US 10,789,019 B2
(45) Date of Patent: Sep. 29, 2020

(54) STORAGE DEVICE CAPABLE OF MANAGING JOBS WITHOUT INTERVENTION OF A PROCESSOR

(71) Applicant: SAMSUNG ELECTRONICS CO., LTD., Suwon-si, Gyeonggi-do (KR)

(72) Inventors: Youngsik Kim, Suwon-si (KR); Jinwoo Kim, Seoul (KR); Hee Hyun Nam, Seoul (KR); Kyungbo Yang, Hwaseong-si (KR); Ji-Seung Youn, Seoul (KR); Younggeun Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 100 days.

(21) Appl. No.: 15/855,840

(22) Filed: Dec. 27, 2017

(65) Prior Publication Data
US 2019/0004869 A1    Jan. 3, 2019

(30) Foreign Application Priority Data

Jun. 30, 2017    (KR) .................. 10-2017-0083817

(51) Int. Cl.
*G06F 9/46*     (2006.01)
*G06F 3/06*     (2006.01)
(Continued)

(52) U.S. Cl.
CPC .............. *G06F 3/0679* (2013.01); *G06F 1/30* (2013.01); *G06F 3/061* (2013.01); *G06F 3/064* (2013.01); *G06F 3/0608* (2013.01); *G06F 3/0616* (2013.01); *G06F 3/0649* (2013.01); *G06F 3/0652* (2013.01); *G06F 3/0658* (2013.01); *G06F 3/0688* (2013.01);
(Continued)

(58) Field of Classification Search
CPC .. G06F 3/0656; G06F 12/0246; G06F 3/0619; G06F 3/0659; G06F 2212/222; G06F 2212/7203; G06F 2212/7201; G06F 3/064; G06F 3/0679; G06F 3/0688; G06F 3/061; G06F 12/10; G06F 11/108; H04L 29/06027
See application file for complete search history.

(56) References Cited

U.S. PATENT DOCUMENTS 7,457,897 B1    11/2008    Lee et al.
7,688,652 B2    3/2010    Oh
(Continued)

FOREIGN PATENT DOCUMENTS

JP      4470455 B2      6/2010
KR      10-0801884 B1   1/2008

*Primary Examiner* — Tuan A Vu
(74) *Attorney, Agent, or Firm* — Volentine, Whitt & Francos, PLLC

(57) ABSTRACT

A storage device includes a nonvolatile memory and a controller. The controller includes a job manager circuit and a processor. The job manager circuit manages a first-type job associated with the nonvolatile memory, and the processor processes a second-type job associated with the nonvolatile memory. The job manager circuit manages the first-type job without intervention of the processor. The processor provides a management command to the job manager circuit in response to a notification received from the job manager circuit, such that the second-type job is processed.

20 Claims, 17 Drawing Sheets

(51) Int. Cl.
  *G06F 12/02* (2006.01)
  *G06F 1/30* (2006.01)
  *G06F 9/50* (2006.01)
  *G06F 12/10* (2016.01)

(52) U.S. Cl.
  CPC ........ *G06F 9/5083* (2013.01); *G06F 12/0246* (2013.01); *G06F 12/10* (2013.01); *G06F 2212/222* (2013.01); *G06F 2212/7201* (2013.01); *G06F 2212/7203* (2013.01)

(56) References Cited

U.S. PATENT DOCUMENTS

| | | |
|---|---|---|
| 8,296,505 B2 | 10/2012 | Min et al. |
| 8,588,228 B1 | 11/2013 | Onufryk et al. |
| 9,009,391 B2 | 4/2015 | Aswadhati |
| 9,606,863 B2 | 3/2017 | Aswadhati |
| 2006/0088035 A1* | 4/2006 | Beeson ............ H04L 29/06027 370/395.52 |
| 2011/0047320 A1 | 2/2011 | Kwon |
| 2016/0321010 A1* | 11/2016 | Hashimoto ......... G06F 12/0246 |
| 2017/0123722 A1* | 5/2017 | Sela ..................... G06F 3/0656 |
| 2017/0286288 A1* | 10/2017 | Higgins ............. G06F 12/0246 |
| 2017/0337103 A1* | 11/2017 | Royer, Jr. ............. G06F 11/108 |
| 2018/0143904 A1* | 5/2018 | Sweere ................. G06F 3/0619 |
| 2018/0173420 A1* | 6/2018 | Li .......................... G06F 3/061 |
| 2018/0341429 A1* | 11/2018 | Bolkhovitin .......... G06F 3/0659 |

\* cited by examiner

STORAGE DEVICE CAPABLE OF MANAGING JOBS WITHOUT INTERVENTION OF A PROCESSOR

CROSS-REFERENCE TO RELATED APPLICATIONS

A claim of priority under 35 U.S.C. § 119 is made to Korean Patent Application No. 10-2017-0083817 filed on Jun. 30, 2017, in Korean Intellectual Property Office, the entire contents of which are hereby incorporated by reference.

BACKGROUND

The present inventive concept relates to an electronic device. More particularly, the present inventive concept relates to operations and configurations of a storage device that store and output data.

Electronic devices typically perform functions according to operations of electronic circuits included therein. In the case of a storage device as an example of an electronic device that includes a memory device for storing data, the memory device stores and/or outputs data and the storage device thus provides a user with a storage service.

As the use of various electronic devices as well as the amount of data accessible by users increase, the demand for mass-capacity storage devices has increased. Additionally, the demand for high-performance and high-efficiency storage devices capable of rapidly processing large amounts of data has also increased.

Most electronic devices are implemented with a centralized architecture which is configured such that a specific circuit or component controls overall operations. In centralized architecture, performance of an electronic device is limited depending on performance and throughput of the specific circuit or component. Accordingly, centralized architecture has become unsuitable to satisfy demands for high-performance and high-efficiency electronic devices.

SUMMARY

Embodiments of the inventive concept provide configurations and operations of a storage device which are implemented with a hardware-automated architecture. In example embodiments, the storage device may manage simple jobs by a dedicated hardware circuit, instead of completely relying on control of a processor.

Embodiments of the inventive concept provide a storage device which includes a nonvolatile memory and a controller. The controller includes a job manager circuit and a processor. The job manager circuit manages a first-type job associated with the nonvolatile memory, and the processor processes a second-type job associated with the nonvolatile memory. The job manager circuit manages the first-type job without intervention of the processor. The processor provides a management command to the job manager circuit in response to a notification received from the job manager. The management command instructs processing of the second-type job.

Embodiments of the inventive concept provide a storage device which includes a nonvolatile memory and a controller. The controller includes a job manager circuit and a processor. The job manager circuit manages a first-type job associated with the nonvolatile memory, and the processor processes a second-type job associated with the nonvolatile memory. The processor does not intervene in the first-type job while the first-type job is managed normally by the job manager circuit. The processor outputs a management command instructing processing of the second-type job, when an intervention condition is satisfied while the processor does not intervene in the first-type job.

Embodiments of the inventive concept provide a storage device which includes a nonvolatile memory and a controller. The controller controls an operation of the nonvolatile memory, and includes a write manager circuit, a read manager circuit, a data domain manager circuit, and a processor. The write manager circuit manages a first job of a first type, the first job including storing write data in the nonvolatile memory. The read manager circuit manages a second job of the first type, that the second job including outputting read data to an outside of the controller. The data domain manager circuit obtains information of a status of at least one of the nonvolatile memory, the write data, and the read data, with regard to performance of the first job and the second job. The processor processes a third job of a second type associated with the nonvolatile memory. The data domain manager circuit provides a notification to the processor based on the obtained information. The processor does not intervene in the first job and the second job when the notification is not received from the data domain manager circuit.

Embodiments of the inventive concept provide a storage device which includes a nonvolatile memory and a controller. The nonvolatile memory store write data and outputs read data. The controller includes a first path for transferring the write data to the nonvolatile memory, a second path for transferring the output read data to an outside of the controller, and a processor. When an error or exception occurs with regard to transferring the write data to the nonvolatile memory along the first path or outputting the output read data to the outside along the second path, the processor outputs a management command which directs a management operation performed on at least one of the first path and the second path. When the error or exception does not occur, the processor does not intervene in a normal operation performed on the first path and the second path.

Embodiments of the inventive concept provide a storage device which includes a nonvolatile memory, a controller, and a buffer memory. The controller includes a job manager circuit and a process. The job manager circuit manages a first-type job associated with the nonvolatile memory, and the processor processes a second-type job associated with the nonvolatile memory. The buffer memory stores first metadata and second metadata. The first metadata is generated or referenced when the first-type job is managed by the job manager circuit, and the second metadata is generated or referenced when the second-type job is processed by the processor. The processor does not intervene in the first-type job while the first-type job is managed normally by the job manager circuit. The processor does not intervene in storing the first metadata in the buffer memory by the job manager circuit and reading the first metadata from the buffer memory by the job manager circuit.

According to example embodiments of the inventive concept, simple jobs which are performed relatively frequently may be managed by a dedicated hardware circuit without intervention of a processor. Accordingly, performance of a storage device may not depend on performance of the processor and throughput of a buffer memory, and power consumption and heat emission of the processor and the buffer memory may decrease. As a result, a high-efficiency storage device capable of high-performance may be provided.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Below, some example embodiments will be described in detail and clearly with reference to accompanied drawings such that those skilled in the art can easily implement the inventive concept.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. Unless indicated otherwise, the circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
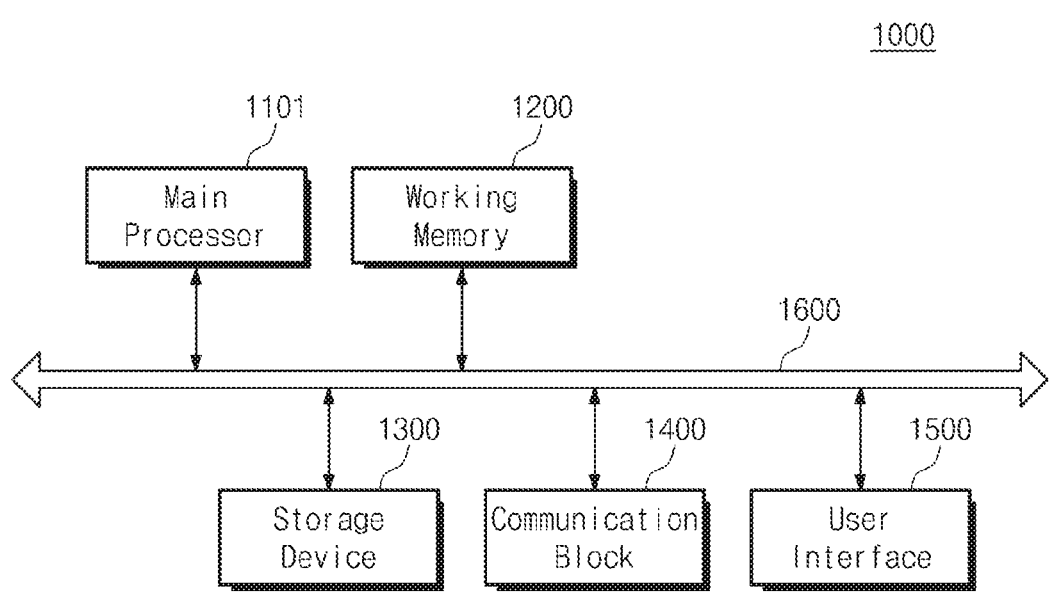
FIG. 1 illustrates a block diagram of an example configuration of an electronic system which includes a storage device according to example embodiments of the inventive concept.

FIG. 1 illustrates a block diagram of an example configuration of an electronic system 1000 which includes a storage device 1300 according to example embodiments of the inventive concept.

The electronic system 1000 includes a main processor 1101, a working memory 1200, the storage device 1300, a communication block 1400, a user interface 1500, and a bus 1600. For example, the electronic system 1000 may be one of electronic devices such as a desktop computer, a laptop computer, a tablet computer, a smart phone, a wearable device, a video game console, a workstation, a server, an electric vehicle, a home appliance, a medical appliance, and/or the like.

The main processor 1101 may control overall operations of the electronic system 1000. The main processor 1101 may process various kinds of arithmetic operations and/or logical operations. To this end, the main processor 1101 may include a special-purpose logic circuit (e.g., a field programmable gate array (FPGA), application specific integrated chips (ASICs), and/or the like). For example, the main processor 1101 may include one or more processor cores, and may be implemented with a general-purpose processor, a special-purpose processor, or an application processor.

The working memory 1200 may store data used in an operation of the electronic system 1000. For example, the working memory 1200 may temporarily store data processed or to be processed by the main processor 1101. The working memory 1200 may include a volatile memory, such as for example a dynamic random access memory (DRAM), a synchronous DRAM (SDRAM), and/or the like, and/or a nonvolatile memory, such as for example a phase-change RAM (PRAM), a magneto-resistive RAM (MRAM), a resistive RAM (ReRAM), a ferro-electric RAM (FRAM), and/or the like.

The storage device 1300 may include one or more memory devices and a controller. The one or more memory devices of the storage device 1300 may store data regardless of power being supplied. For example, the storage device 1300 may include a nonvolatile memory, such as for example a flash memory, a PRAM, an MRAM, a ReRAM, a FRAM, and/or the like. For example, the storage device 1300 may include a storage medium, such as a solid state drive (SSD), a card storage, an embedded storage, and/or the like.

The communication block 1400 may communicate with an external device/system of the electronic system 1000. For example, the communication block 1400 may support at least one of various wireless communication protocols such as long term evolution (LTE), worldwide interoperability for microwave access (WIMAX), global system for mobile communication (GSM), code division multiple access (CDMA), Bluetooth™, near field communication (NFC), wireless fidelity (Wi-Fi), radio frequency identification (RFID), and/or the like, and/or at least one of various wired communication protocols such as transfer control protocol/Internet protocol (TCP/IP), universal serial bus (USB), Firewire™, and/or the like.

The user interface 1500 may perform communication arbitration between a user and the electronic system 1000. For example, the user interface 1500 may include input interfaces, such as a keyboard, a mouse, a keypad, a button, a touch panel, a touch screen, a touch pad, a touch ball, a camera, a microphone, a gyroscope sensor, a vibration sensor, and/or the like. For example, the user interface 1500 may include output interfaces, such as a liquid crystal display (LCD) device, a light emitting diode (LED) display device, an organic LED (OLED) display device, an active matrix OLED (AMOLED) display device, a speaker, a motor, an LED lamp, and/or the like.

The bus 1600 may provide a communication path between components of the electronic system 1000. The components of the electronic system 1000 may exchange data with one another based on a bus format of the bus 1600. For example, the bus format may include one or more of various interface protocols, such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), and/or the like.

The storage device 1300 may be implemented with a hardware-automated architecture according to example embodiments of the inventive concept. In the example embodiments, the storage device 1300 may manage simple jobs by using a dedicated hardware circuit, instead of completely relying on control of an internal processor. The simple jobs which are performed relatively frequently may be managed by the dedicated hardware circuit without intervention of the internal processor, and thus performance and efficiency of the storage device 1300 may be improved. Example configurations and operations of the storage device 1300 will be described with reference to FIGS. 2 to 17.

The storage device 1300 will be described as follows with reference to FIGS. 2-17 as noted, but the inventive concept is not limited to the described embodiments. The example embodiments may be employed in any type of device including a memory device. For example, the example embodiments may be employed even for a volatile memory and/or a nonvolatile memory included in the working memory 1200. The following descriptions are provided to facilitate better understanding, and are not intended to limit the inventive concept.

Figure 2:
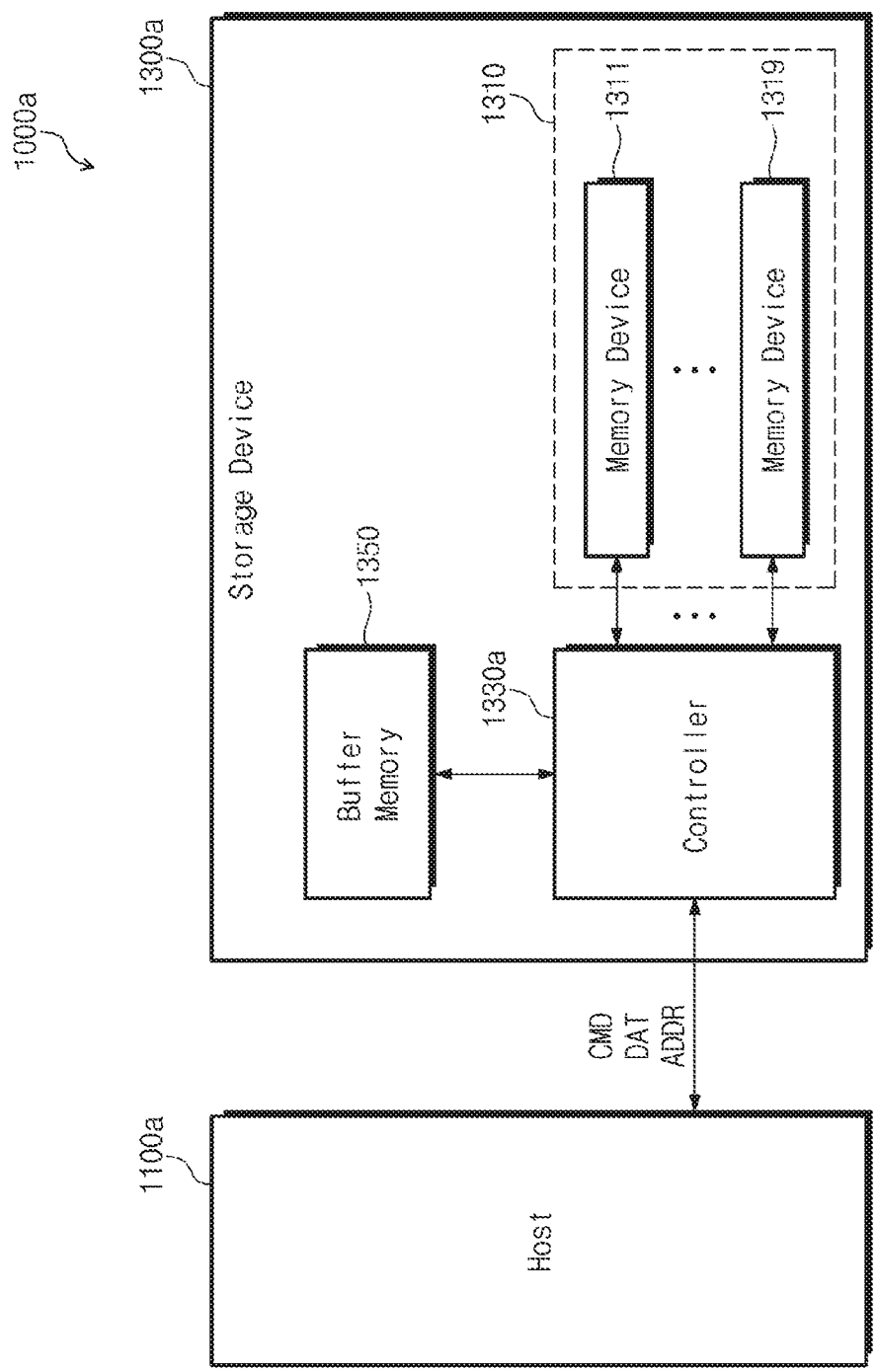
FIG. 2 illustrates a block diagram of an example configuration associated with a storage device of FIG. 1.

FIG. 2 illustrates a block diagram of an example configuration associated with the storage device 1300 of FIG. 1. The electronic system 1000 of FIG. 1 may be embodied as an electronic system 1000a shown in FIG. 2, whereby the storage device 1300 and the main processor 1101 of FIG. 1 are respectively embodied in FIG. 2 as a storage device 1300a and host 1100a. The electronic system 1000a of FIG. 2 further includes working memory 1200, communication block 1400, user interface 1500 and bus 1600 of FIG. 1, which features have been omitted from FIG. 2 for simplicity.

As described with reference to FIG. 1, the main processor 1101 may communicate with the storage device 1300 through the bus 1600. In the embodiment as described with reference to FIG. 2, an object which is able to access the storage device 1300a is referred to as a "host" 1100a. The main processor 1101 may be an example of various objects which are able to operate as the host 1100. However, it should be understood that the inventive concept should not be limited to host 1100a as being a main processor such as shown in FIG. 1.

Returning to FIG. 2, the host 1100a may exchange data DAT with the storage device 1300a. The storage device 1300a may provide a storage service to the host 1100a, in response to a command CMD received from the host 1100a.

For example, the host 1100a may provide a write command (i.e., CMD) and write data (i.e., DAT) to the storage device 1300a. The storage device 1300a may store the requested write data in response to the write command. For example, the host 1100a may provide a read command (i.e., CMD) to the storage device 1300a. The storage device 1300a may output requested read data (i.e., DAT) to the host 1100a in response to the read command.

The storage device 1300a includes one or more memory devices 1310 and a controller 1330a. FIG. 2 illustrates two memory devices 1311 and 1319, but the number of memory devices included in the storage device 1300a may be variously changed or modified.

Each of the memory devices 1311 and 1319 may store or output data requested by the host 1100a. To this end, each of the memory devices 1311 and 1319 may include memory region(s) for storing data. The memory devices 1311 and 1319 may include a nonvolatile memory, such as for example a flash memory, a PRAM, an MRAM, a ReRAM, a FRAM, and/or the like. For example, when each of the memory devices 1311 and 1319 includes a NAND-type flash memory, each of the memory devices 1311 and 1319 may include an array of memory cells formed along a plurality of word lines and a plurality of bit lines, and operations directed to the memory devices 1311 and 1319 may be performed on a page unit or a block unit of a memory region. However, as described with reference to FIG. 1, a type and a configuration of each of the memory devices 1311 and 1319 may be variously changed or modified.

A memory region may be identified and indicated based on a value which is called as an "address". Write data may be stored in a memory region indicated by an address, and read data may be output from a memory region indicated by an address.

The host 1100a may provide an address ADDR to the storage device 1300a to exchange data with regard to a specific memory region of the memory devices 1311 and

1319. The storage device 1300*a* may control the memory devices 1311 and 1319 based on a request (e.g., the command CMD) and the address ADDR received from the host 1100*a*.

Meanwhile, the address ADDR processed by the host 1100*a* may be different from an address which indicates a memory region in the memory devices 1311 and 1319. For example, the address ADDR processed by the host 1100*a* may be referred to as a "logical address", and an address in/for the memory devices 1311 and 1319 may be referred to as a "physical address". The storage device 1300*a* may perform address translation between a logical address processed by the host 1100*a* and a physical address for the memory devices 1311 and 1319, to control the memory devices 1311 and 1319 suitably.

The controller 1330*a* may control overall operations of the storage device 1300*a*. For example, the controller 1330*a* may schedule operations of the memory devices 1311 and 1319, or may encode and decode signals/data processed in the storage device 1300*a*. For example, the controller 1330*a* may control the memory devices 1311 and 1319 such that the memory devices 1311 and 1319 store or output data.

The controller 1330*a* may include one or more hardware components (e.g., an analog circuit, a logic circuit, and/or the like) which are configured to perform some operations described above and to be described below. In addition, the controller 1330*a* may include one or more processor cores. Some operations of the controller 1330*a* described above and to be described below may be implemented with a program code of software and/or firmware, and processor core(s) of the controller 1330*a* may execute an instruction set of the program code. The processor core(s) of the controller 1330*a* may process various kinds of arithmetic operations and/or logical operations to execute the instruction set.

A buffer memory 1350 may buffer data used in an operation of the storage device 1300*a*. For example, the buffer memory 1350 may temporarily store data referenced by the controller 1330*a*. However, the buffer memory 1350 does not store write data to be stored in the memory devices 1311 and 1319 and data output from the memory devices 1311 and 1319, which will be described below. Instead, the buffer memory 1350 may be provided as an auxiliary memory for storing metadata which will be referenced by the controller 1330*a*. For example, the buffer memory 1350 may include a volatile memory such as for example a static RAM (SRAM), a DRAM, an SDRAM, and/or the like, and/or a nonvolatile memory such as for example a flash memory, a PRAM, an MRAM, an ReRAM, an FRAM, and/or the like.

Figure 3:
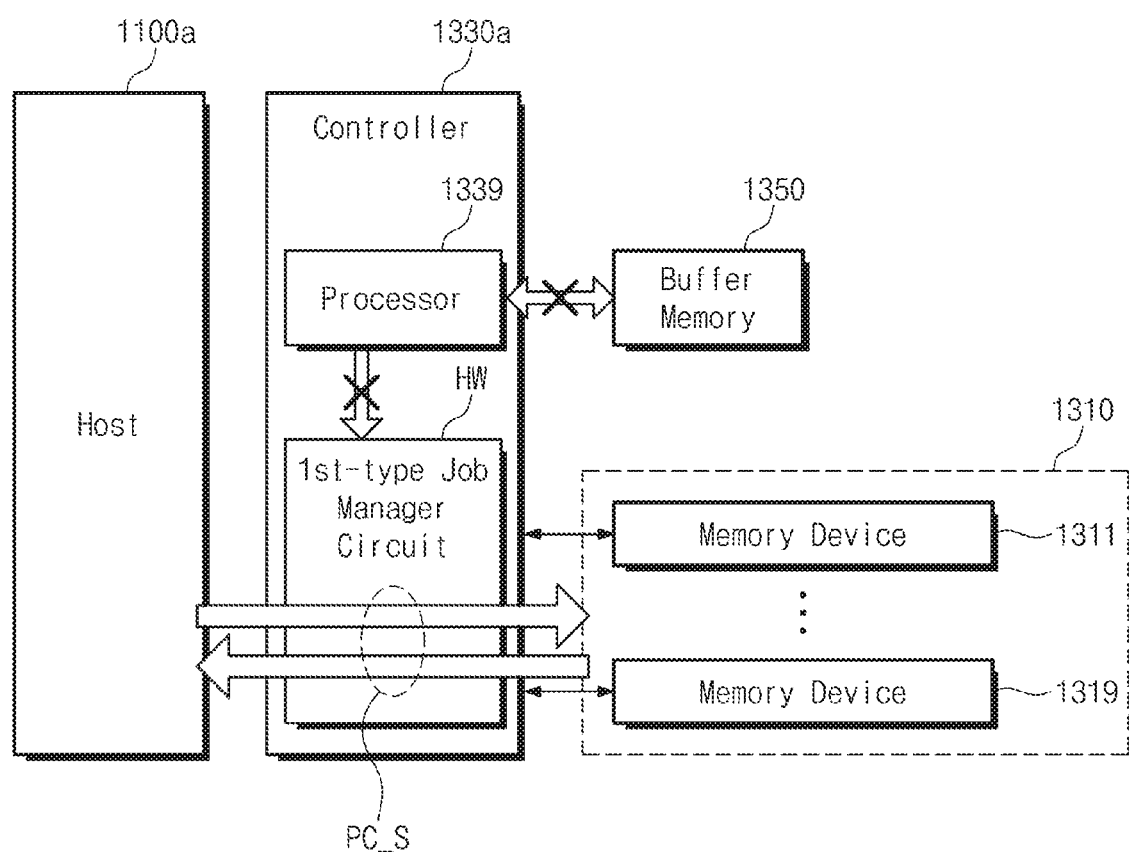
FIG. 3 illustrates a block diagram descriptive of example operations of a storage device of FIG. 2 according to example embodiments of the inventive concept.
Figure 4:
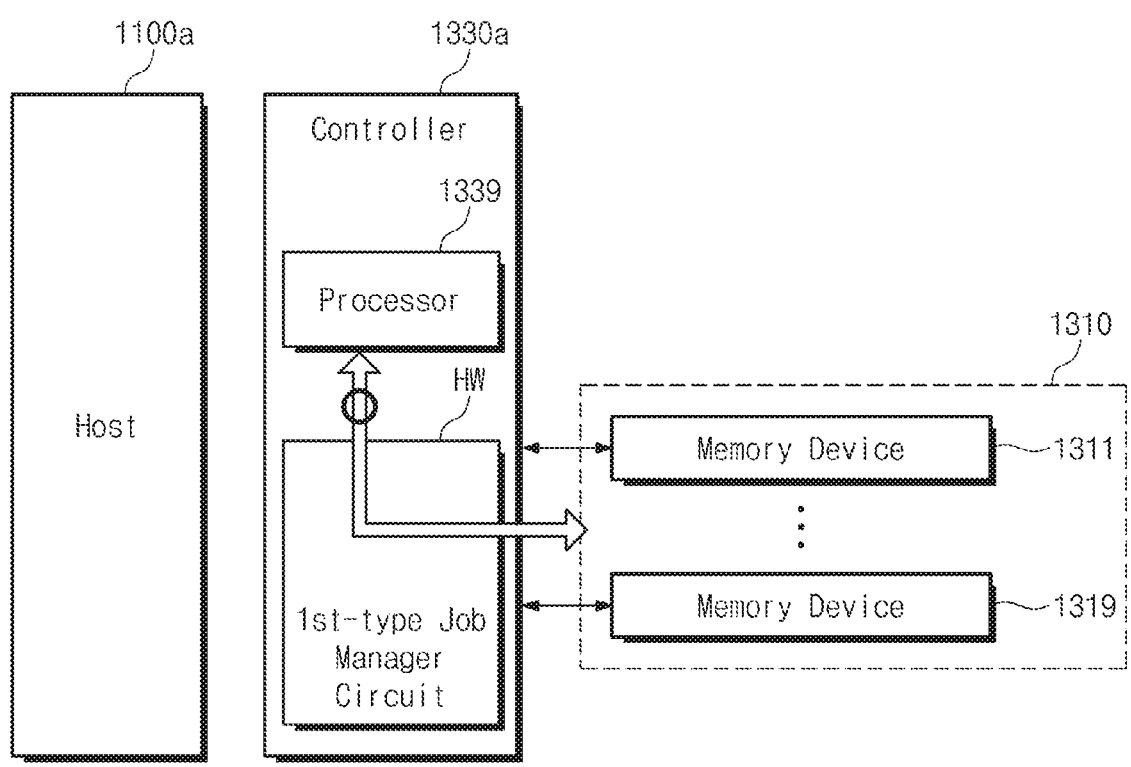
FIG. 4 illustrates a block diagram descriptive of example operations of a storage device of FIG. 2 according to further example embodiments of the inventive concept.

FIGS. 3 and 4 illustrate block diagrams descriptive of example operations of the storage device 1300*a* of FIG. 2 according to example embodiments of the inventive concept.

Referring to FIGS. 3 and 4, the controller 1330*a* includes a first-type job manager circuit HW and a processor 1339. The first-type job manager circuit HW may manage a first-type job associated with the memory devices 1311 and 1319. The processor 1339 may process a second-type job associated with the memory devices 1311 and 1319. For example, the first-type job may include a simple job which is performed more frequently than the second-type job.

For example, the first-type job may include an operation which is performed on a first unit size of a memory region of the memory devices 1311 and 1319. For example, the first unit size may include a page unit size. For example, the first-type job may include general operations, such as a write operation for storing write data in the memory devices 1311 and 1319, a read operation for outputting read data from the memory devices 1311 and 1319, and/or the like.

For example, the second-type job may include an operation which is performed on a second unit size of a memory region of the memory devices 1311 and 1319. The second unit size may be different from the first unit size, and for example, may include a block/sub-block/super-block unit size. For example, the second-type job may include management operations, such as garbage collection, wear leveling, read refresh, error detection and correction, power failure protection, and/or the like.

Example embodiments based on the above examples will be described as follows. However, such example embodiments are provided to facilitate better understanding, and are not intended to limit the inventive concept. The first-type job may be variously changed or modified to manage a simple job, which is performed frequently, without intervention of the processor 1339. In addition, the second-type job may be variously changed or modified to process a complex job under control of the processor 1339. Also, the first unit size and the second unit size may be variously changed or modified, and may be identical to each other in some example embodiments.

FIG. 3 illustrates an operation associated with a first-type job. For example, the first-type job may include an operation requested by the host 1100*a*. The first-type job may be managed according to an operation of a hardware circuit or the like included in the first-type job manager circuit HW without intervention of the processor 1339.

For example, while the first-type job is managed, intervention of the processor 1339 may be excluded from all operations including allocating a buffer region for data, buffering data, triggering data input/output, controlling a path of the data input/output, and/or the like. While the first-type job is managed normally by the first-type job manager circuit HW, the processor 1339 does not intervene in the first-type job and does not communicate with the buffer memory 1350.

When the first-type job includes a write operation for example, the first-type job manager circuit HW may transfer write data received from the host 1100*a* to the one or more memory devices 1310 along a write path. When the first-type job includes a read operation for example, the first-type job manager circuit HW may transfer read data output from the one or more memory devices 1310 to the host 1100*a* along a read path. The write data and the read data may be transferred in a packet unit of a stream PC_S respectively along the write and read paths.

In the meantime, in the operation associated with a first-type job, the buffer memory 1350 does not store the write data that is to be stored in the one or more memory devices 1310 and/or the read data that is output from the one or more memory devices 1310. Instead, the write data and the read data may be managed in an internal buffer of the first-type job manager circuit HW.

An example configuration of the hardware circuit included in the first-type job manager circuit HW will be more fully described with reference to FIG. 5. An example configuration of a packet will be more fully described with reference to FIG. 6. An example first-type job will be more fully described with reference to FIGS. 7 to 13.

FIG. 4 illustrates an operation associated with a second-type job. For example, the second-type job may include an operation which is performed regardless or in absence of a request of the host 1100*a*. The second-type job may be processed under control of the processor 1339 (e.g., based on a program code of software and/or firmware executed on the processor 1339).

For example, the first-type job manager circuit HW may monitor a status associated with operations of the one or more memory devices 1310 and the controller 1330a. The first-type job manager circuit HW may manage an intervention condition for triggering intervention of the processor 1339, based on the monitored status. For example, the monitored status may be associated with whether an error or exception occurs in association with the first-type job (e.g., a write operation or a read operation). For example, the intervention condition may be satisfied when the error or exception associated with the first-type job occurs.

When the intervention condition is satisfied while the processor 1339 does not intervene in the first-type job, the first-type job manager circuit HW may provide the processor 1339 with a notification including information of the monitored status. Accordingly, the first-type job manager circuit HW may notify the processor 1339 that the intervention condition is satisfied.

The processor 1339 may output a management command for processing the second-type job, in response to the notification received from the first-type job manager circuit HW. The first-type job manager circuit HW may receive the management command from the processor 1339. The first-type job manager circuit HW may perform the second-type job directed by the management command. The second-type job may include a management operation for resolving the monitored status (e.g., the error or exception associated with the first-type job).

For example, the second-type job may include a management operation directed to the one or more memory devices 1310. The first-type job manager circuit HW may communicate with the one or more memory devices 1310, to perform the second-type job (e.g., a management operation) under control of the processor 1339. An example second-type job will be more fully described with reference to FIGS. 14 and 15.

Figure 5:
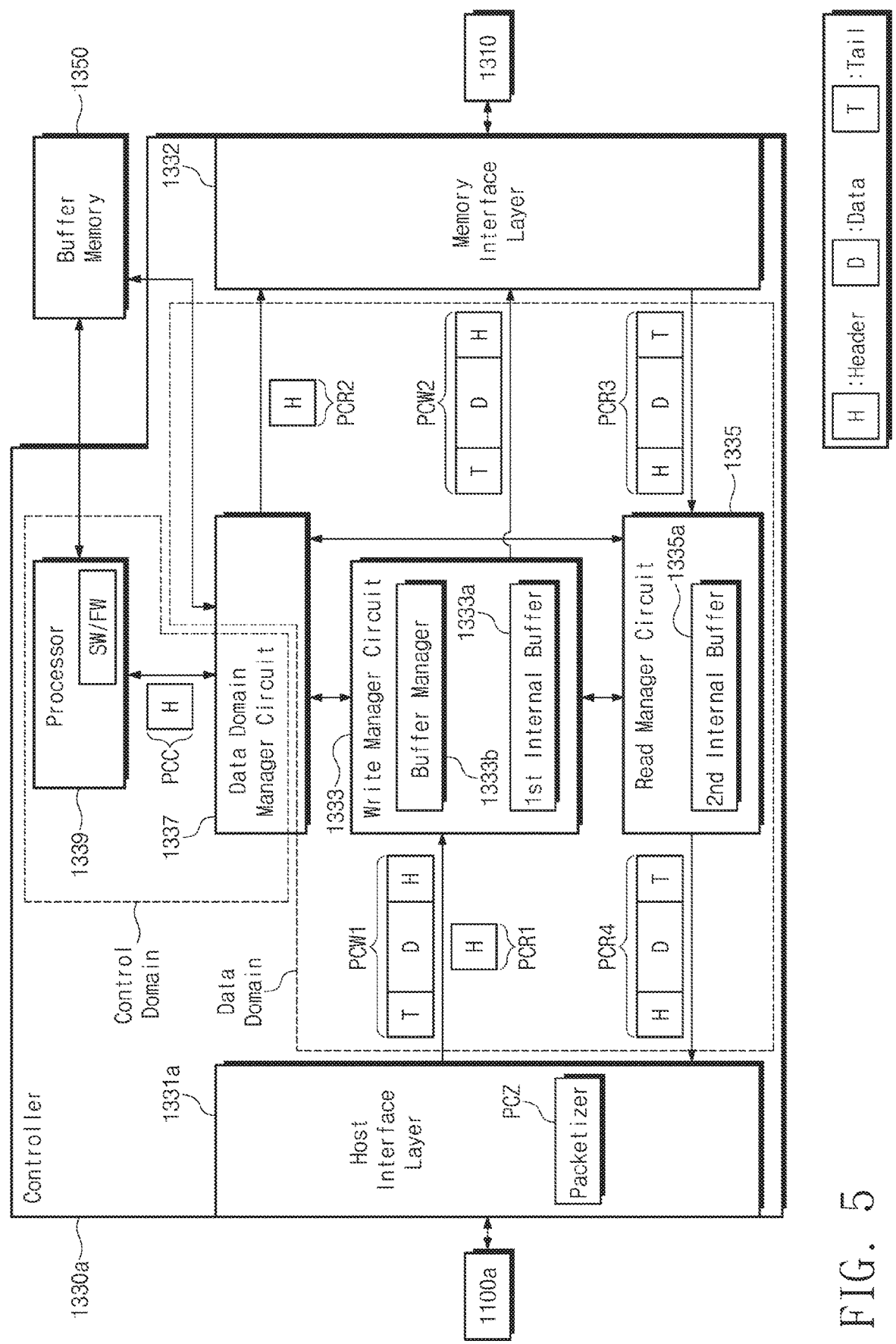
FIG. 5 illustrates a block diagram of an example configuration of a controller of FIG. 2 according to example embodiments of the inventive concept.

FIG. 5 illustrates a block diagram of an example configuration of the controller 1330a of FIG. 2 according to example embodiments of the inventive concept.

The controller 1330a includes a host interface layer 1331a, a memory interface layer 1332, a write manager circuit 1333, a read manager circuit 1335, a data domain manager circuit 1337, and the processor 1339. For example, the write manager circuit 1333, the read manager circuit 1335, and the data domain manager circuit 1337 may be included in the first-type job manager circuit HW of FIGS. 3 and 4.

The host interface layer 1331a may interface with the host 1100a. For example, the host interface layer 1331a may convert a command (i.e., CMD) and data (i.e., DAT), which are received from the host 1100a, to a format which is processed in the controller 1330a. For example, the host interface layer 1331a may convert data which is processed in the controller 1330a to a format which is handled in the host 1100a, and may output data (i.e., DAT) of the converted format to the host 1100a.

The memory interface layer 1332 may interface with the one or more memory devices 1310. For example, the memory interface layer 1332 may convert write data and an associated command to a format which is handled in the one or more memory devices 1310. For example, the memory interface layer 1332 may convert read data, which is received from the one or more memory devices 1310, to a format which is processed in the controller 1330a.

The write manager circuit 1333 may manage the first-type job. For example, the write manager circuit 1333 may manage a write operation (which may also be characterized as a first job of a first type) for storing write data in the one or more memory devices 1310. In this example, the write manager circuit 1333 may be on a write path (i.e., a first path) for transferring write data received from the host 1100a to the one or more memory devices 1310.

The read manager circuit 1335 may manage the first-type job. For example, the read manager circuit 1335 may manage a read operation (which may also be characterized as a second job of a first type) for outputting read data to an outside of the controller 1330a (e.g., to the host 1100a). In this example, the read manager circuit 1335 may be on a read path (i.e., a second path) for transferring read data output from the one or more memory devices 1310 to the outside of the controller 1330a.

The data domain manager circuit 1337 may obtain information of a status of at least one of the one or more memory devices 1310, write data, and/or read data, with regard to performing the first-type job. The write manager circuit 1333 and the read manager circuit 1335 may perform the first-type job and thus may provide information of various statuses to the data domain manager circuit 1337. The data domain manager circuit 1337 may monitor a status associated with operations of the one or more memory devices 1310 and the controller 1330a, based on the obtained information.

The processor 1339 may include one or more processor cores. The processor 1339 may execute a program code of software (SW) and/or firmware (FW) according to an operation of a processor core. The processor 1339 may execute the program code of software and/or firmware to process the second-type job.

A command and data may be transferred in a packet unit of a stream. To this end, in some example embodiments, the host interface layer 1331a may include a packetizer PCZ.

The packetizer PCZ may combine a command and data, which are received from the host 1100a, with additional information (e.g., a destination of a packet, an address, an error check bit, and/or the like), to generate a packet PCW1 or a packet PCR1. When a write command and write data are received from the host 1100a, the packetizer PCZ may generate the packet PCW1 including a header portion, a data portion, and a tail portion. For example, the header portion may include information of the write command, and the data portion may include the write data. The tail portion may include information which is suitable to indicate completion of the data portion.

When a read command is received from the host 1100a, the packetizer PCZ may generate the packet PCR1 including a header portion. The header portion may include information of the read command. Data may not be received with regard to the read operation, and thus in some cases, the packet PCR1 may not include a data portion and a tail portion.

The packetizer PCZ may include a hardware circuit configured to generate the packet PCW1 or the packet PCR1 based on a command and data received from the host 1100a. An example configuration of a packet processed in the controller 1330a will be more fully described with reference to FIG. 6.

The write manager circuit 1333 includes a first internal buffer 1333a and a buffer manager 1333b. The write manager circuit 1333 may receive the packet PCW1 or the packet PCR1. When the header portion of the packet PCW1 or the packet PCR1 includes information of a command, the write manager circuit 1333 may determine whether the received packet is associated with a write operation or a read operation, with reference to the header portion.

When the write manager circuit 1333 receives the packet PCW1 associated with a write operation, the first internal buffer 1333*a* may buffer various information and write data which are included in the packet PCW1. For example, the first internal buffer 1333*a* may include a memory device such as an SRAM. The buffer manager 1333*b* may manage allocation of a buffer region of the first internal buffer 1333*a*, such that a hazard or collision does not occur when the first internal buffer 1333*a* stores information.

The write manager circuit 1333 may transfer a packet PCW2 to the memory interface layer 1332, based on the write data buffered in the first internal buffer 1333*a*. The memory interface layer 1332 may determine a physical address of a memory region in which the write data is to be stored, with reference to the header portion of the packet PCW2. The memory interface layer 1332 may transfer the write data to a target memory device which includes a memory region of the determined physical address. Accordingly, the write data may be stored in the one or more memory devices 1310.

When the write operation is performed, the write manager circuit 1333 may map a logical address received from the host 1100*a* to a physical address. The physical address to be mapped may be selected from a list of available physical addresses which is managed by the write manager circuit 1333, the data domain manager circuit 1337, and/or the processor 1339. The write data may be stored in a memory region of the mapped physical address of the one or more memory devices 1310.

The write manager circuit 1333 may provide the data domain manager circuit 1337 with information of the received logical address and the mapped physical address. The data domain manager circuit 1337 may manage information of a correspondence relationship between the logical address and the physical address in the buffer memory 1350. The buffer memory 1350 may store the information of the correspondence relationship as first metadata. An example write operation will be further described with reference to FIGS. 7 to 9.

On the other hand, when the write manager circuit 1333 receives the packet PCR1 associated with a read operation, the write manager circuit 1333 may transfer the packet PCR1 to the data domain manager circuit 1337. For example, the write manager circuit 1333 may be configured to route a received packet, based on additional information of the received packet. The write manager circuit 1333 may act as a switch with regard to transferring a command and data.

The data domain manager circuit 1337 may obtain a physical address corresponding to the packet PCR1, with reference to the correspondence relationship of the first metadata which is stored in the buffer memory 1350. That is, the first metadata may be generated or referenced when the first-type job is managed. The data domain manager circuit 1337 may generate a packet PCR2 including information of the obtained physical address. The data domain manager circuit 1337 may transfer the packet PCR2 to the memory interface layer 1332.

The memory interface layer 1332 may transfer a read command to a target memory device which includes a memory region of the obtained physical address, with reference to a header portion of the packet PCR2. Accordingly, read data may be output from the target memory device. The memory interface layer 1332 may provide the read manager circuit 1335 with a packet PCR3 including the output read data.

The read manager circuit 1335 includes a second internal buffer 1335*a*. The second internal buffer 1335*a* may buffer a variety of information included in the packet PCR3. For example, the second internal buffer 1335*a* may include a memory device such as an SRAM. The read manager circuit 1335 may transfer a packet PCR4 to the host interface layer 1331*a*, based on the read data buffered in the second internal buffer 1335*a*.

The host interface layer 1331*a* may transfer the read data included in the packet PCR4 to the host 1100*a*. Accordingly, the read data may be output from the one or more memory devices 1310 to the outside of the controller 1330*a*. An example read operation will be further described with reference to FIGS. 10 to 13.

Each of the write manager circuit 1333, the read manager circuit 1335, and the data domain manager circuit 1337 may include a hardware circuit configured to perform operations described above and to be described below. The write manager circuit 1333, the read manager circuit 1335, and the data domain manager circuit 1337 may automatically process the first-type job without intervention of the processor 1339. A command and data may be packetized in a regular format, and thus the hardware circuit of each of the write manager circuit 1333, the read manager circuit 1335, and the data domain manager circuit 1337 may manage a packet unit of a stream based on the additional information of a packet even without intervention of the processor 1339.

While the first-type job is managed normally, the processor 1339 does not intervene in the first-type job. In addition, the processor 1339 does not intervene in generating a packet by the packetizer PCZ and transferring a packet unit of a stream along a write path and a read path. Moreover, the processor 1339 does not intervene in storing the first metadata in the buffer memory 1350 by the data domain manager circuit 1337 and reading the first metadata from the buffer memory 1350 by the data domain manager circuit 1337.

While the first-type job is managed, the data domain manager circuit 1337 may obtain a variety of information from the write manager circuit 1333 and the read manager circuit 1335. The obtained information may indicate various statuses associated with operations of the one or more memory devices 1310 and the controller 1330*a*, including an error or exception. The data domain manager circuit 1337 may manage an intervention condition for triggering intervention of the processor 1339, based on the obtained information.

When an error or exception occurs with regard to the first-type job, failure may occur in an operation of the controller 1330*a* or the storage device 1300*a*. However, the first-type job may include a simple job and may not be suitable to resolving the error or exception. The second-type job may be required to resolve the error or exception, and the processor 1339 may intervene to process the second-type job (which may also be characterized as a third job of a second type).

For example, the intervention condition may be satisfied when the error or exception occurs with regard to the first-type job. In an embodiment, the intervention condition may be satisfied when the error or exception occurs with regard to transferring write data to the one or more memory devices 1310 along a write path or outputting read data from the one or more memory devices 1310 to the outside of the controller 1330*a* along a read path. The data domain manager circuit 1337 may provide a notification to the processor 1339, to notify the processor 1339 that the intervention condition is satisfied. When the notification is not received, the processor 1339 does not intervene in managing the first-type job, generating and transferring a packet, and managing the first metadata. In such a case, the processor 1339 does not intervene in general operation of the write path and the read path.

On the other hand, when the notification is received, the processor 1339 may provide a management command to the data domain manager circuit 1337 to process the second-type job. The management command may direct a management operation which is performed on at least one of a write path and/or a read path. The notification and the management command may be included in a header portion of a packet PCC.

The processor 1339 may communicate with the buffer memory 1350 to process the second-type job. The buffer memory 1350 may store second metadata. The second metadata may be generated or referenced when the second-type job is processed. That is, the processor 1339 may store the second metadata in the buffer memory 1350 or may read the second metadata stored in the buffer memory 1350, to process the second-type job.

The data domain manager circuit 1337 may perform the second-type job in response to the management command. That is, when the error or exception occurs, the processor 1339 may intervene and the second-type job may be performed under control of the processor 1339. When the second-type job accompanies a write operation and/or a read operation, the data domain manager circuit 1337 may provide a suitable command to the write manager circuit 1333 and/or the read manager circuit 1335. An example management operation will be further described with reference to FIGS. 14 and 15.

According to example embodiments of the present disclosure, the controller 1330a may include a data domain (indicated by dashed line in FIG. 5) associated with the first-type job. In addition, the controller 1330a may include a control domain (indicated separately by dashed line in FIG. 5) associated with the second-type job. The write manager circuit 1333 and the read manager circuit 1335 may manage the first-type job in the data domain, and the processor 1339 may process the second-type job in the control domain. The data domain manager circuit 1337 may manage the first-type job in the data domain, and may trigger intervention of the processor 1339 in the control domain. The data domain manager circuit 1337 is thus shown in FIG. 5 as part of both the control domain and the data domain.

In a storage device having a centralized architecture, flow of all pieces of data including write data and read data is concentrated to (e.g., routed to) a buffer memory such as buffer memory 1350 shown in FIG. 5, and a processor such as processor 1339 shown in FIG. 5 intervenes in both a first-type job and a second-type job. In the case of such a centralized architecture, performance of the storage device is limited depending on performance of the processor and throughput of the buffer memory. Processing a simple job by the processor increases the load of the processor and excessively occupies a bandwidth of the buffer memory.

On the other hand, in the hardware-automated architecture according to the example embodiments of the inventive concept such as described with reference to FIG. 5 for example, managing simple jobs by a separate hardware circuit without intervention of the processor 1339 may improve performance and efficiency of the storage device 1300a. In addition, power consumption and heat emission of the processor 1339 and the buffer memory 1350 may decrease, which may be advantageous in terms of lifespan and reliability of the storage device 1300a.

As illustrated in FIG. 5, the write path may be physically separated from the read path. Accordingly, a write operation and a read operation may be performed in parallel or concurrently or simultaneously. This may further improve performance for processing simple jobs.

As described above, the buffer memory 1350 may store the first metadata and the second metadata. In some example embodiments, the first metadata may be stored separately from the second metadata (e.g., a memory region for storing the first metadata may be different from a memory region for storing the second metadata). In some example embodiments, only the data domain manager circuit 1337 may access both the first metadata and the second metadata, and the processor 1339 may read the second metadata through the data domain manager circuit 1337. According to such example embodiments, even though the first metadata and the second metadata are respectively and independently managed by the data domain manager circuit 1337 and the processor 1339, coherency and integrity of the first metadata and the second metadata may be secured.

Figure 6:
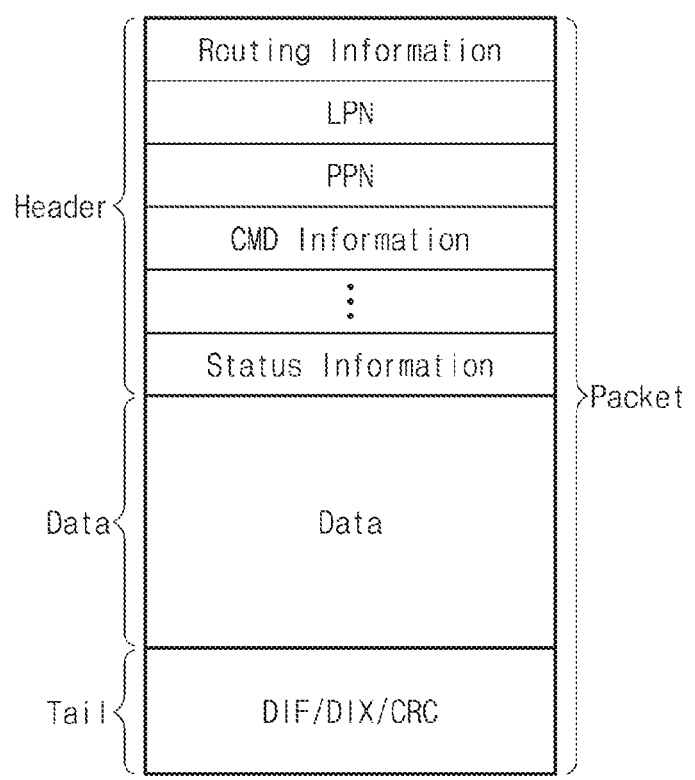
FIG. 6 illustrates a conceptual diagram of an example configuration of a packet of FIG. 5 according to example embodiments of the inventive concept.

FIG. 6 illustrates a conceptual diagram of an example configuration of a packet of FIG. 5 according to example embodiments of the inventive concept.

As described with reference to FIG. 5, one packet may include a header portion, a data portion, and a tail portion. The data portion may include write data or read data.

For example, the header portion may include routing information, information of a logical address LPN, information of a physical address PPN, information of a command CMD, status information, and/or the like. The routing information may indicate a destination of a packet, and for example, may include a component identifier or a marker.

The logical address LPN may include an address received from the host 1100a, and the physical address PPN may include a physical address which is mapped to the logical address LPN. The command CMD may indicate a type of an operation requested by the packet. The status information may indicate a status associated with operations of the one or more memory devices 1310 and the controller 1330a (e.g., a status associated with an error or exception).

However, at least one of pieces of information illustrated in FIG. 6 may be excluded from the header portion of one packet. For example, the information of the physical address PPN may not be included in a packet (e.g., PCW1) which is provided from the host interface layer 1331a to the write manager circuit 1333. For example, the status information may not be included in a packet which is generated to transfer write data from the host 1100a to the one or more memory devices 1310 or a packet which is generated to transfer read data from the one or more memory devices 1310 to the host 1100a. A configuration of the header portion may be variously changed or modified depending on a purpose of a packet.

The tail portion may include information which is suitable to indicate completion of the data portion. For example, the tail portion may include integrity/error check information, such as data integrity feature (DIF), data integrity extension (DIX), and cyclic redundancy check (CRC). However, the tail portion of the inventive concept is not limited to the aforementioned information, and in other embodiments the tail portion may be configured to include other information.

In embodiments the one packet may include all of the header portion, the data portion, and the tail portion. Alternatively, in other embodiments the one packet may not include at least one of the header portion, the data portion, and/or the tail portion.

For example, a packet which is generated to transfer write data from the host 1100a to the one or more memory devices 1310 or a packet which is generated to transfer read data from the one or more memory devices 1310 to the host 1100a may include all of the header portion, the data portion, and the tail portion. For example, a packet which is generated to transfer a read command from the host 1100a to the one or more memory devices 1310, a notification packet which is provided from the data domain manager circuit 1337 to the processor 1339, and a management command packet which is provided from the processor 1339 to the data domain manager circuit 1337 may include only the header portion.

However, the above examples are provided to facilitate better understanding, and are not intended to limit the inventive concepts. A configuration of a packet may be variously changed or modified to automatically manage the first-type job by a separate hardware circuit without intervention of the processor 1339.

Figure 7:
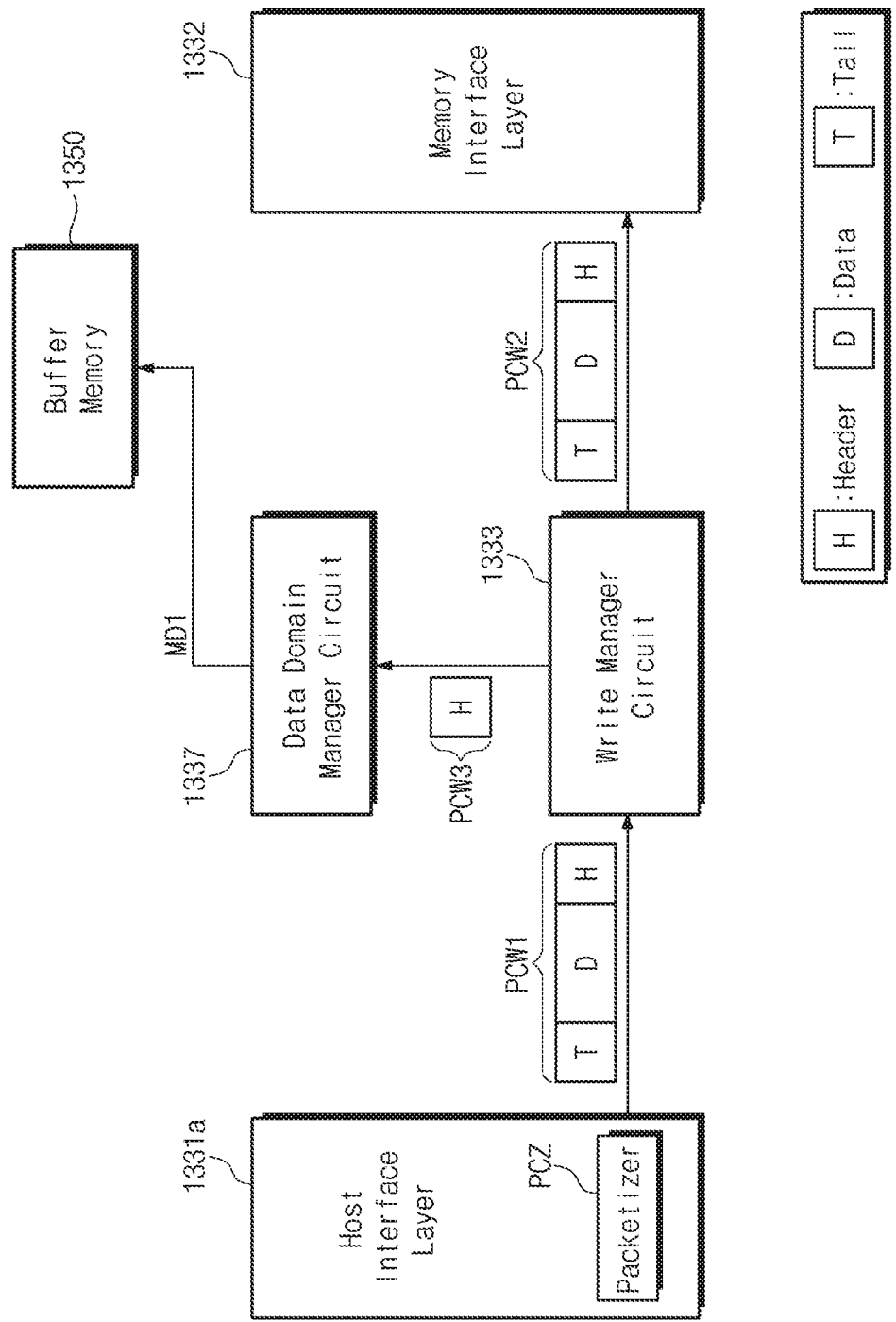
FIG. 7 illustrates a block diagram descriptive of an example write operation which is performed in a storage device of FIG. 2 according to example embodiments of the inventive concept.
Figure 8:
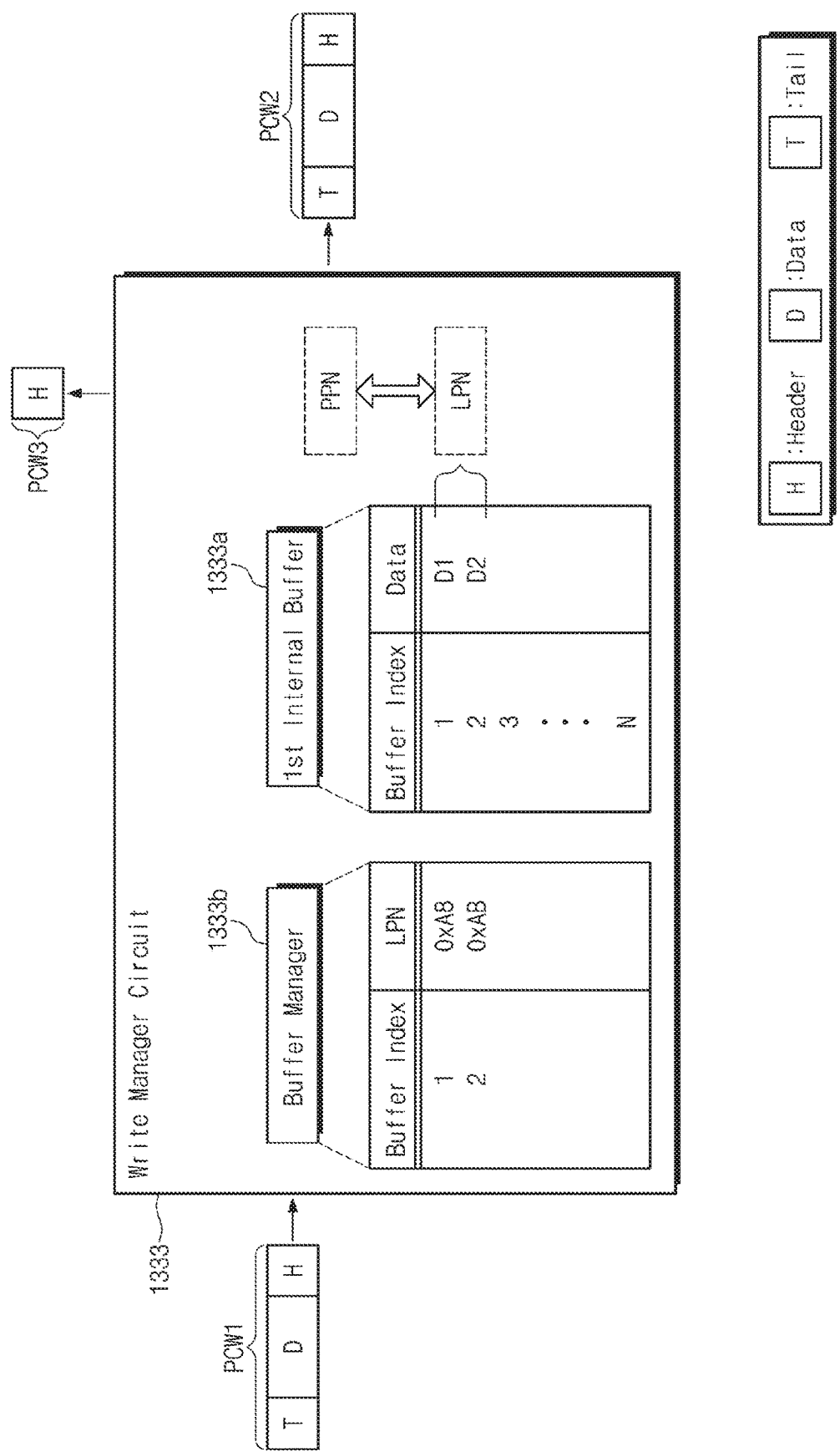
FIG. 8 illustrates a block diagram descriptive of an example write operation which is performed in a storage device of FIG. 2 according to example embodiments of the inventive concept.
Figure 9:
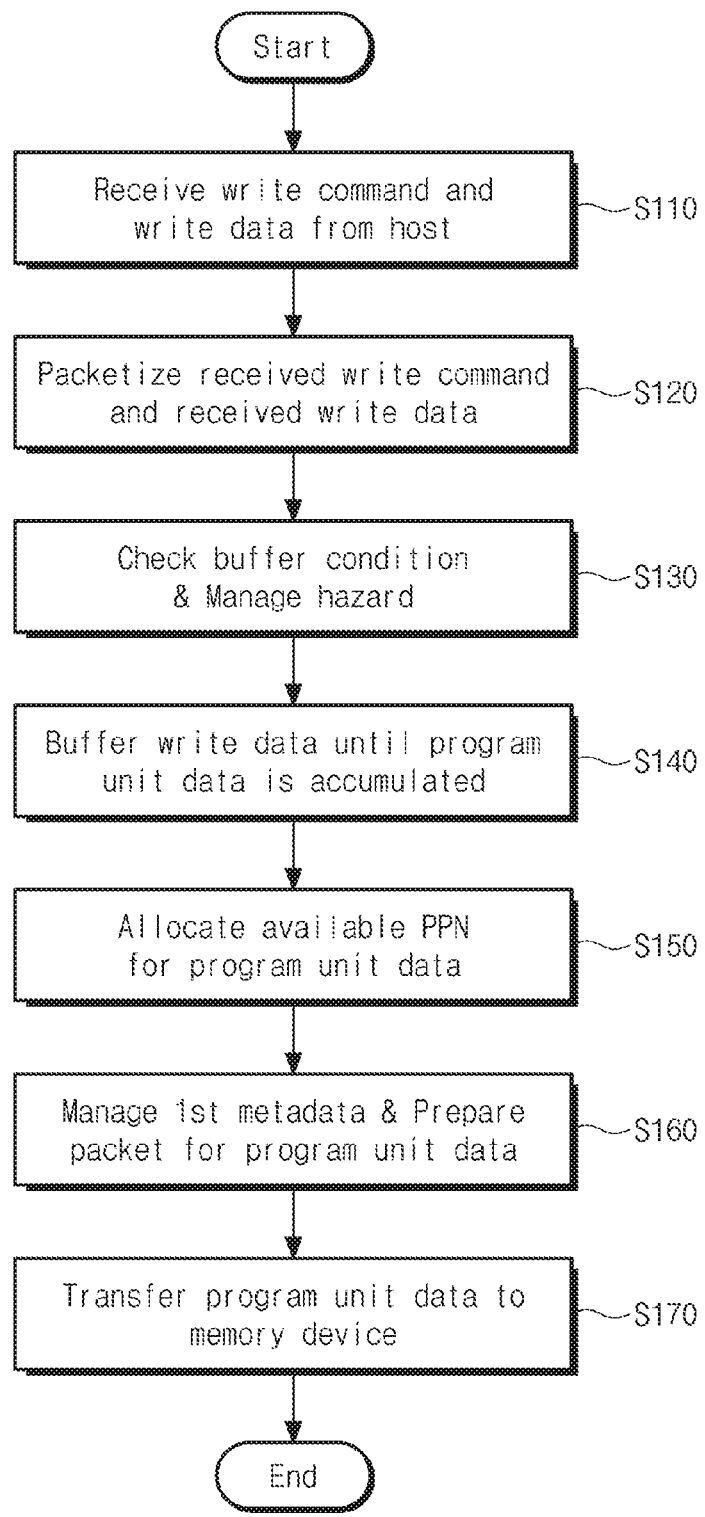
FIG. 9 illustrates a flowchart descriptive of an example write operation which is performed in a storage device of FIG. 2 according to example embodiments of the inventive concept.

FIGS. 7 and 8 illustrate block diagrams descriptive of an example write operation which is performed in the storage device 1300a of FIG. 2 according to example embodiments of the inventive concept. FIG. 9 illustrates a flowchart descriptive of an example write operation which is performed in the storage device 1300a of FIG. 2 according to example embodiments of the inventive concept. To facilitate better understanding, FIGS. 7 to 9 will be referred to together. In particular, FIG. 7 illustrates the components of the storage device 1300a illustrated and described with respect to FIG. 5, whereby some of the components and details in FIG. 5 may have been excluded from FIG. 7 for the sake of simplicity of illustration.

Referring to FIG. 7, the host interface layer 1331a may receive a write command and write data from the host 1100a (operation S110 of FIG. 9). The packetizer PCZ may packetize the write command and the write data (operation S120 of FIG. 9). For example, the packetizer PCZ may combine the write command and the write data with additional information to generate the packet PCW1. For example, a header portion of the packet PCW1 may include information of the write command and a logical address, and a data portion of the packet PCW1 may include the write data. The packet PCW1 may be provided to the write manager circuit 1333.

In some cases, the header portion of the packet PCW1 may include information such as a type of data, a configuration of data, an exception, and/or the like. The write manager circuit 1333 may determine whether to manage the respective information and how to manage the respective information, based on the information included in the packet PCW1.

Referring to FIG. 8, for example, the buffer manager 1333b may manage a buffer index and a logical address. The buffer index may indicate a location of each buffer region of the first internal buffer 1333a. For example, when write data D1 associated with a logical address of "0xA8" is buffered in a buffer region of a buffer index of "1", the buffer manager 1333b may manage the buffer index and the logical address such that the buffer index of "1" corresponds to the logical address of "0xA8".

For example, the buffer manager 1333b may include a memory device for storing the buffer index and the logical address. Alternatively or additionally, the buffer manager 1333b may use a partial memory region of the first internal buffer 1333a to manage the buffer index and the logical address.

The first internal buffer 1333a may buffer write data in a buffer region of each buffer index. FIG. 8 illustrates that only write data is managed in a buffer region of each buffer index. However, in some example embodiments, the first internal buffer 1333a may further manage other information (e.g., a logical address, a command, and/or the like) associated with respective write data.

When the write manager circuit 1333 receives the packet PCW1, the buffer manager 1333b may check a status of the first internal buffer 1333a in response to the packet PCW1. For example, the buffer manager 1333b may check whether a logical address included in the received packet PCW1 has already been managed. Accordingly, the buffer manager 1333b may manage a hazard or collision (operation S130 of FIG. 9).

For example, in some cases, write data included in the packet PCW1 may accompany the same logical address as a logical address associated with previous write data which has already been buffered in the first internal buffer 1333a. This may mean that the host 1100a intends to change the previous write data to new write data, with regard to the same logical address. Accordingly, in response to the determination of the buffer manager 1333b, the first internal buffer 1333a may invalidate the previous write data and may buffer the new write data with regard to the same logical address. This may prevent data collision with regard to the same logical address.

On the other hand, in some cases, the packet PCW1 may include a newly received logical address. In this case, the buffer manager 1333b may allocate a buffer region of a new buffer index, for new write data included in the packet PCW1. The buffer manager 1333b may manage the new buffer index and the newly received logical address, and the first internal buffer 1333a may buffer the new write data in the allocated buffer region.

Meanwhile, in some cases, a size of write data received from the host 1100a may be different from a program unit size of program unit data which is stored by one write operation. For example, the host 1100a may provide write data of 4 kilobytes (KB) to the storage device 1300a, but the write operation may be performed once to store program unit data of 32 KB in the one or more memory devices 1310. That is, the program unit size of the program unit data which is stored by one write operation may be 32 KB. In this case, the first internal buffer 1333a may buffer a plurality of pieces of write data until the program unit data is accumulated (operation S140 of FIG. 9). In contrast, when the size of write data is greater than the program unit size, the write manager circuit 1333 may divide the write data into a plurality of pieces of program unit data.

When the program unit data is accumulated, the write manager circuit 1333 may allocate an available physical address to the program unit data (operation S150 of FIG. 9). Accordingly, a logical address associated with each of pieces of write data of the program unit data may be mapped to a physical address. The physical address which is to be allocated may be selected from a list of available physical addresses which is managed by the write manager circuit 1333, the data domain manager circuit 1337, and/or the processor 1339.

Returning back to FIG. 7, the write manager circuit 1333 may provide a packet PCW3 to the data domain manager circuit 1337. A header portion of the packet PCW3 may include information of a logical address and the allocated physical address which are associated with a write address. Accordingly, the data domain manager circuit 1337 may manage a correspondence relationship between the logical address and the physical address, based on the received packet PCW3. The data domain manager circuit 1337 may manage the correspondence relationship in first metadata MD1 (operation S160 of FIG. 9). The buffer memory 1350 may store the first metadata MD1.

The write manager circuit 1333 may prepare the packet PCW2 for the program unit data (operation S160 of FIG. 9). The packet PCW2 may include the program unit data, and additional information indicating the allocated physical address. The write manager circuit 1333 may transfer the packet PCW2 to the memory interface layer 1332. Accordingly, the write data and the write command may be transferred in a packet unit of a stream through the write manager circuit 1333 along a write path.

The program unit data and the allocated physical address may be transferred by the memory interface layer 1332 to the one or more memory devices 1310 (operation S170 of FIG. 9). Accordingly, the program unit data may be stored in a memory region indicated by the allocated physical address.

Figure 10:
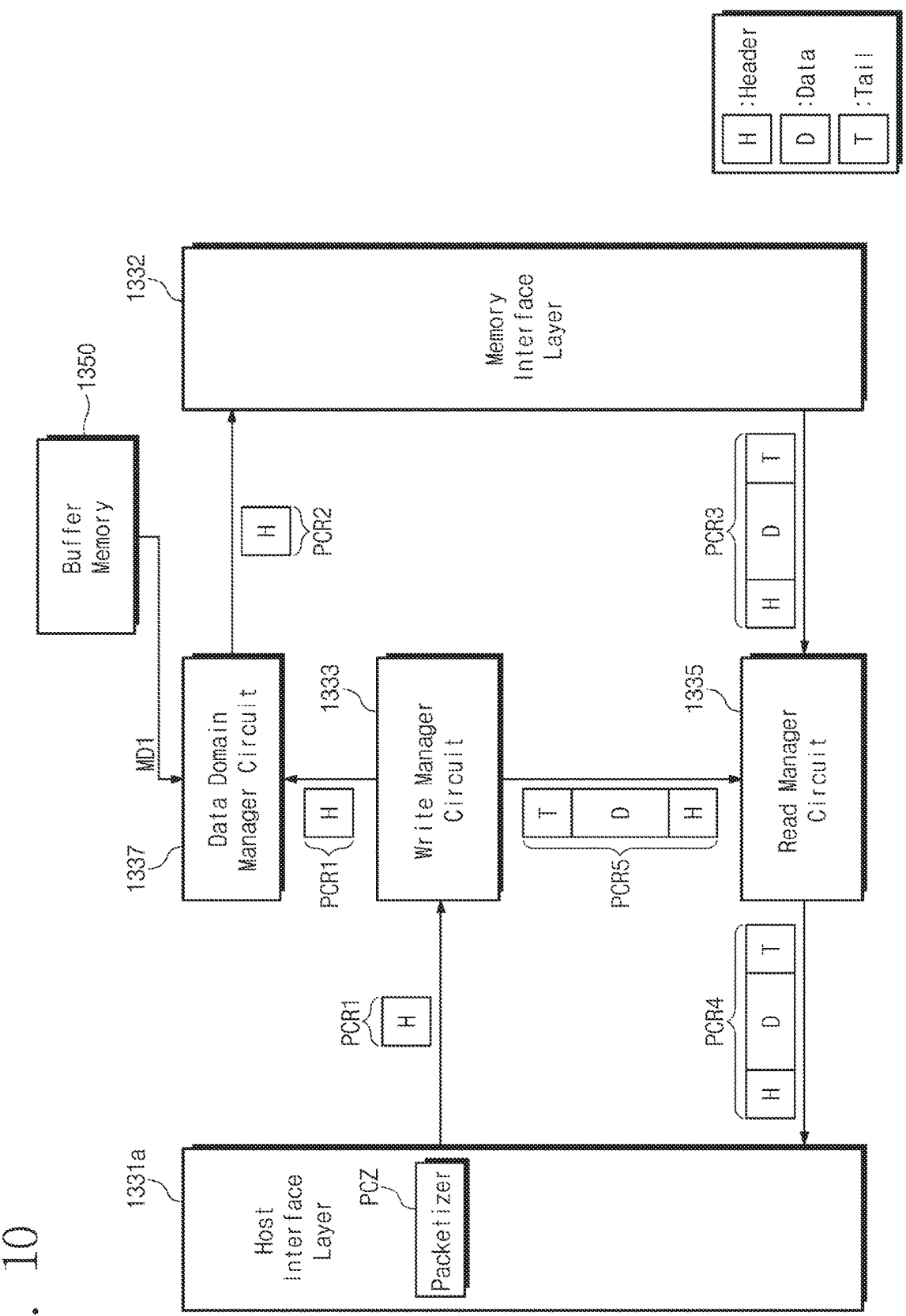
FIG. 10 illustrates a block diagram descriptive of an example read operation which is performed in a storage device of FIG. 2 according to example embodiments of the inventive concept.
Figure 11:
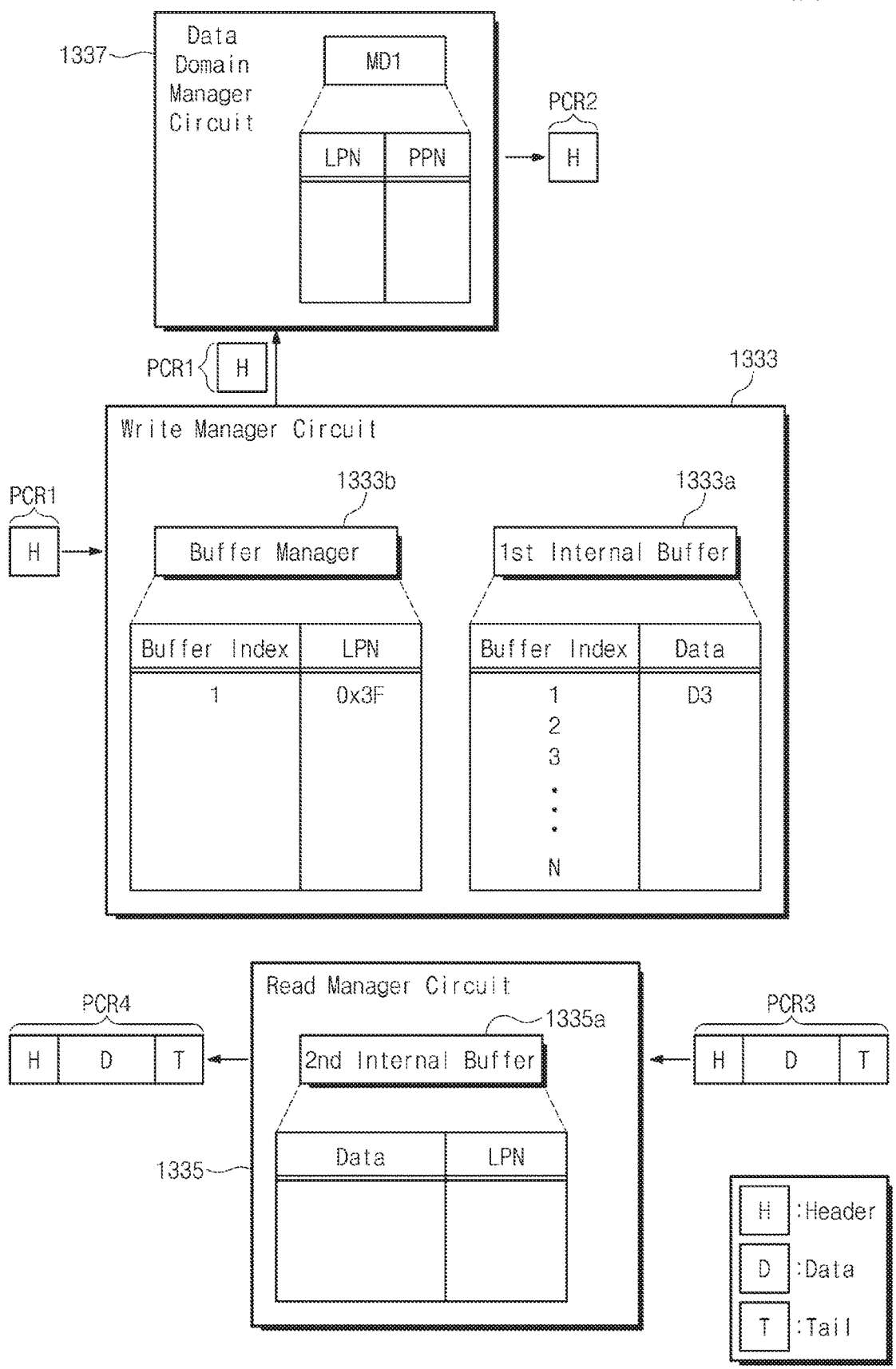
FIG. 11 illustrates a block diagram descriptive of an example read operation which is performed in a storage device of FIG. 2 according to example embodiments of the inventive concept.
Figure 12:
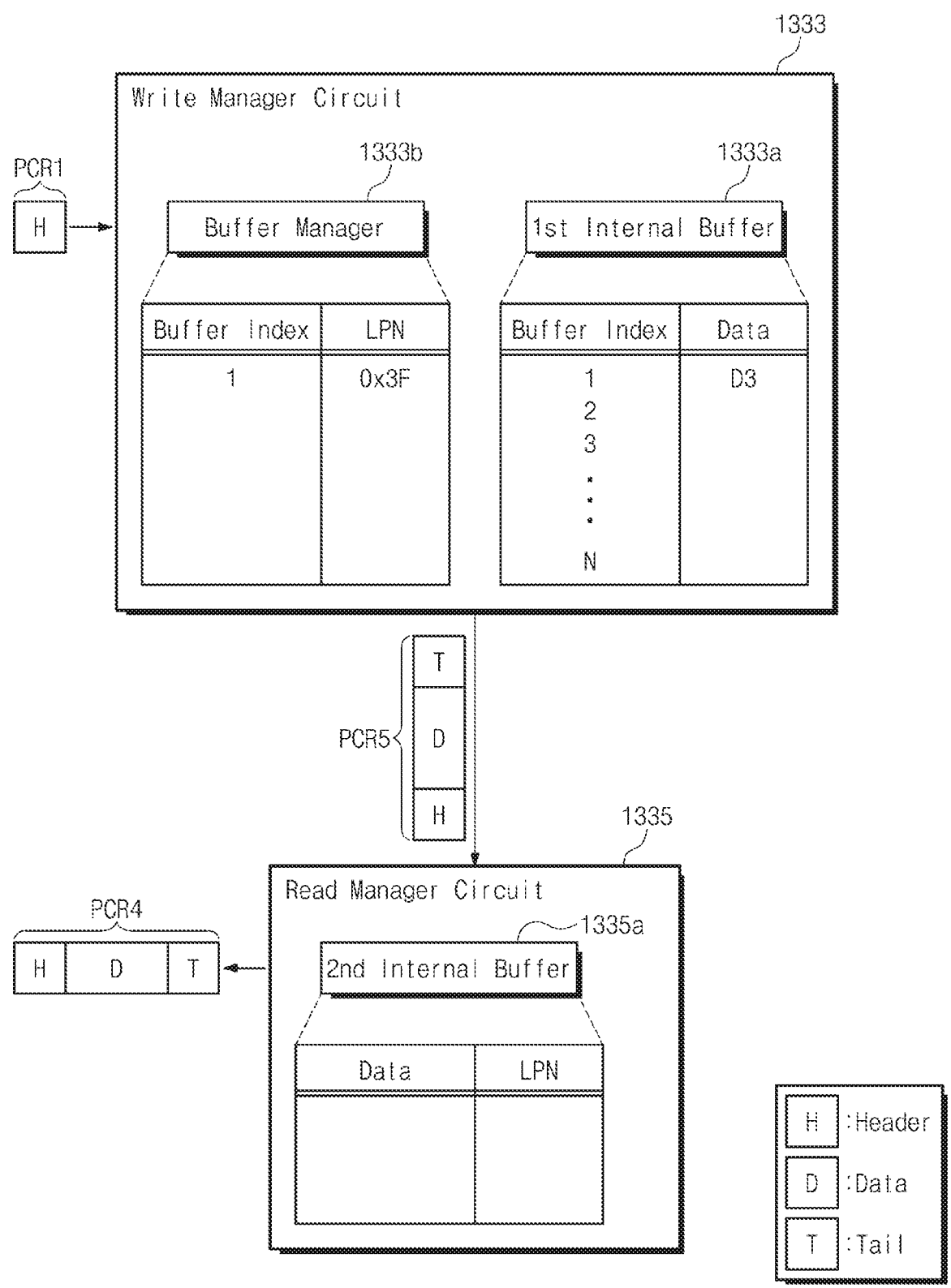
FIG. 12 illustrates a block diagram descriptive of an example read operation which is performed in a storage device of FIG. 2 according to example embodiments of the inventive concept.
Figure 13:
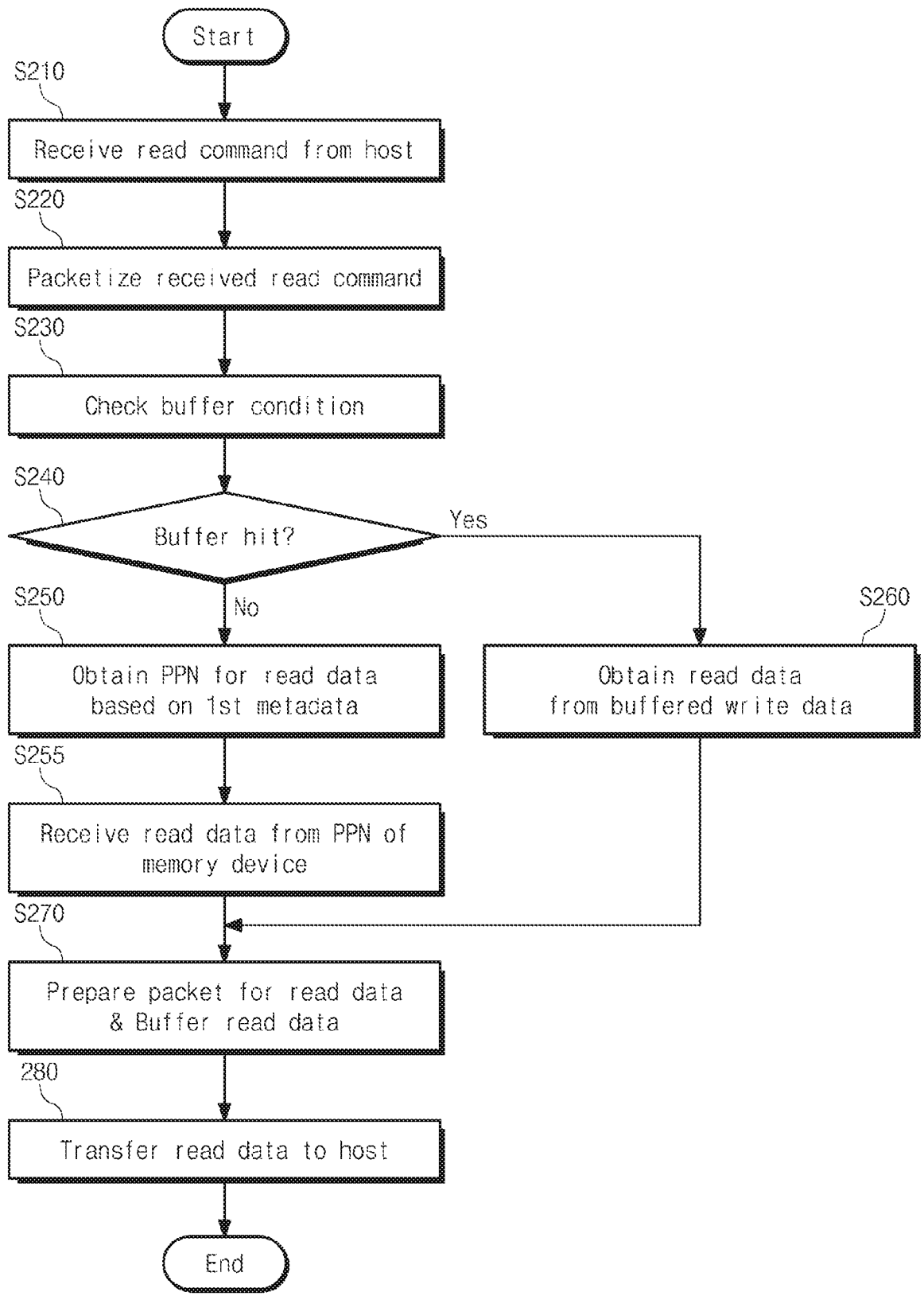
FIG. 13 illustrates a flowchart descriptive of an example read operation which is performed in a storage device of FIG. 2 according to example embodiments of the inventive concept.

FIGS. 10 to 12 illustrate block diagrams descriptive of an example read operation which is performed in the storage device 1300a of FIG. 2 according to example embodiments of the inventive concept. FIG. 13 illustrates a flowchart descriptive of an example read operation which is performed in the storage device 1300a of FIG. 2 according to example embodiments of the inventive concept. To facilitate better understanding, FIGS. 10 to 13 will be referred to together. In particular, FIG. 10 illustrates the components of the storage device 1300a illustrated and described with respect to FIG. 5, whereby some of the components and details in FIG. 5 may have been excluded from FIG. 10 for the sake of simplicity of illustration.

Referring to FIG. 10, the host interface layer 1331a may receive a read command from the host 1100a (operation S210 of FIG. 13). The packetizer PCZ may packetize the read command (operation S220 of FIG. 13). For example, the packetizer PCZ may combine the read command with additional information to generate the packet PCR1. For example, a header portion of the packet PCR1 may include information of the read command and a logical address which are associated with read data. The packet PCR1 may be provided to the write manager circuit 1333.

Referring to FIG. 11, when the write manager circuit 1333 receives the packet PCR1, the buffer manager 1333b may check a status of the first internal buffer 1333a in response to the packet PCR1 (operation S230 of FIG. 13). For example, the buffer manager 1333b may check whether a logical address included in the received packet PCR1 has already been managed (i.e., whether read data requested by the packet PCR1 is being buffered in the first internal buffer 1333a).

In some cases, the read data requested by the packet PCR1 may have been stored in the one or more memory devices 1310, and may not be buffered in the first internal buffer 1333a (i.e., a buffer miss, which corresponds to "No" of operation S240 of FIG. 13). In this case, the write manager circuit 1333 may provide the data domain manager circuit 1337 with the packet PCR1 including the read command and the logical address.

The data domain manager circuit 1337 may obtain the logical address in response to the packet PCR1 and the read command. The data domain manager circuit 1337 may obtain a physical address corresponding to the obtained logical address, based on the first metadata MD1 of the buffer memory 1350 (operation S250 of FIG. 13). The data domain manager circuit 1337 may generate the packet PCR2. A header portion of the packet PCR2 may include information of the read command and the obtained physical address.

The packet PCR2 may be provided to the memory interface layer 1332. Accordingly, the read command and the physical address may be provided to the one or more memory devices 1310 (see FIG. 2) through the memory interface layer 1332. Read data may be output from a memory region of the one or more memory devices 1310 indicated by the physical address, in response to the read command.

The memory interface layer 1332 may provide the packet PCR3 to the read manager circuit 1335 based on the output read data. A data portion of the packet PCR3 may include the output read data from the one or more memory devices 1310, and thus the read manager circuit 1335 may receive the read data (operation S255 of FIG. 13). The second internal buffer 1335a may buffer the read data. For example, the read manager circuit 1335 may manage read data and a logical address associated with respective read data, in the second internal buffer 1335a.

On the other hand, in some cases, the read data requested by the packet PCR1 may not be yet stored in the one or more memory devices 1310, and may be still buffered in the first internal buffer 1333a (i.e., buffer hit, which corresponds to "Yes" of operation S240 of FIG. 13). For example, referring to FIG. 12, read data D3 associated with a logical address of "0x3F" may be buffered in the first internal buffer 1333a before program unit data is accumulated. The host 1100a may intend to read the read data D3.

The buffer manager 1333b may determine buffer hit based on the packet PCR1. In this case, the write manager circuit 1333 may provide a packet PCR5 to the read manager circuit 1335. A data portion of the packet PCR5 may include the read data D3. Accordingly, the read manager circuit 1335 may obtain the read data D3 from write data which is buffered in the first internal buffer 1333a (operation S260 of FIG. 13). The second internal buffer 1335a may buffer the read data.

Returning back to FIG. 10, the read manager circuit 1335 may buffer a data portion of the packet PCR3 (e.g., read data output from the one or more memory devices 1310) or a data portion of the packet PCR5 (e.g., read data which has been buffered in the write manager circuit 1333) (operation S270 of FIG. 13). The read manager circuit 1335 may prepare a packet PCR4 for the read data (operation S270 of FIG. 13). A header portion of the packet PCR4 may include information of the logical address requested by the host 1100a, and a data portion of the packet PCR4 may include the read data requested by the host 1100a.

The read manager circuit 1335 may transfer the packet PCR4 to the host interface layer 1331a. Accordingly, the read data may be transferred in a packet unit of a stream through the read manager circuit 1335 along a read path. The read data may be transferred to the outside of the controller 1330a (e.g., to the host 1100a) (operation S280 of FIG. 13) by the host interface layer 1331a.

In example embodiments of the inventive concept, the memory interface layer 1332 may add information associated with a result of a read operation to the packet PCR3. For example, the information associated with the result of the read operation may include information of an error, exception, and/or the like. In some cases, the information associated with the result of the read operation may be transferred to the host 1100a together with the read data.

Figure 14:
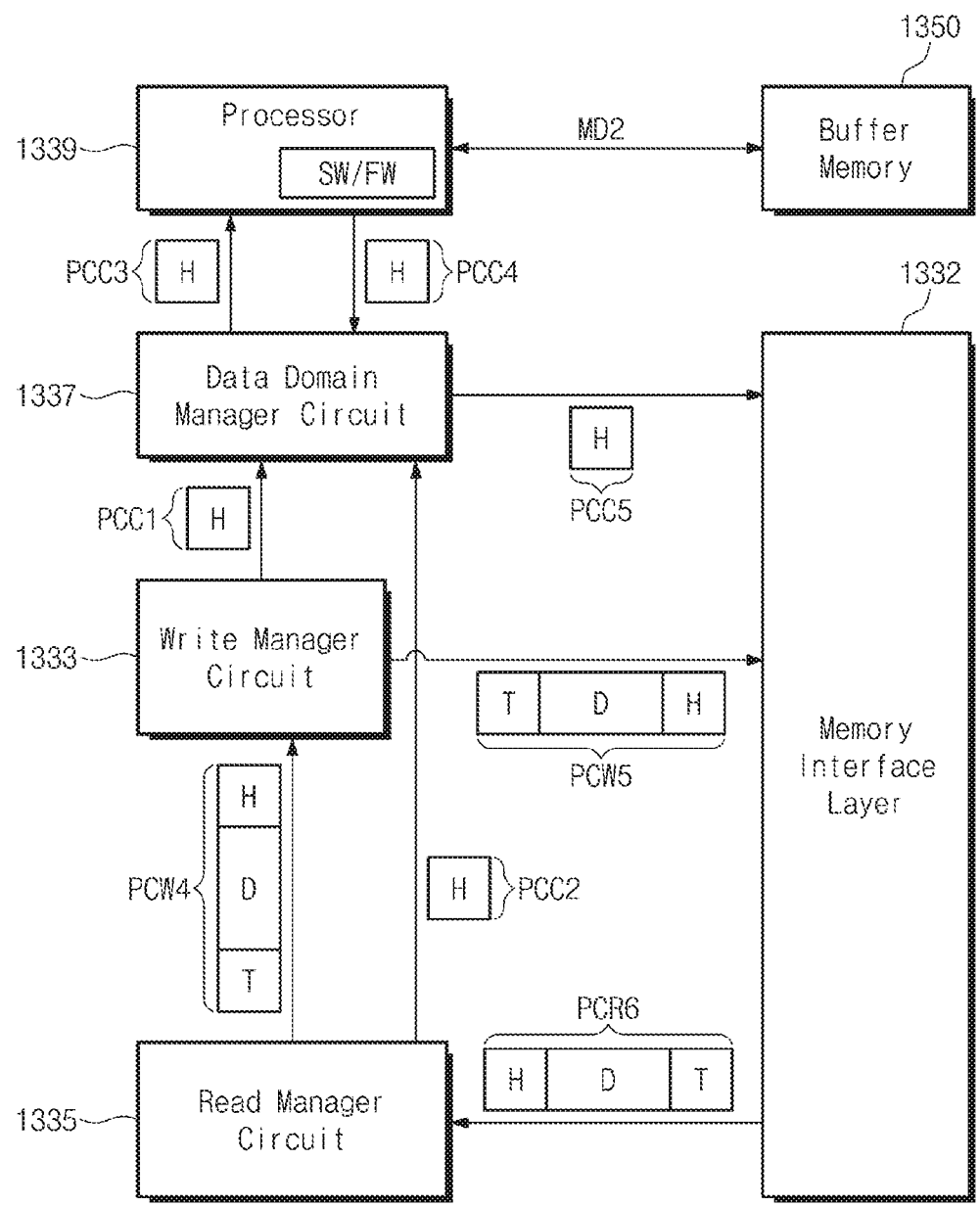
FIG. 14 illustrates a block diagram descriptive of an example management operation which is performed in a storage device of FIG. 2 according to example embodiments of the inventive concept.
Figure 15:
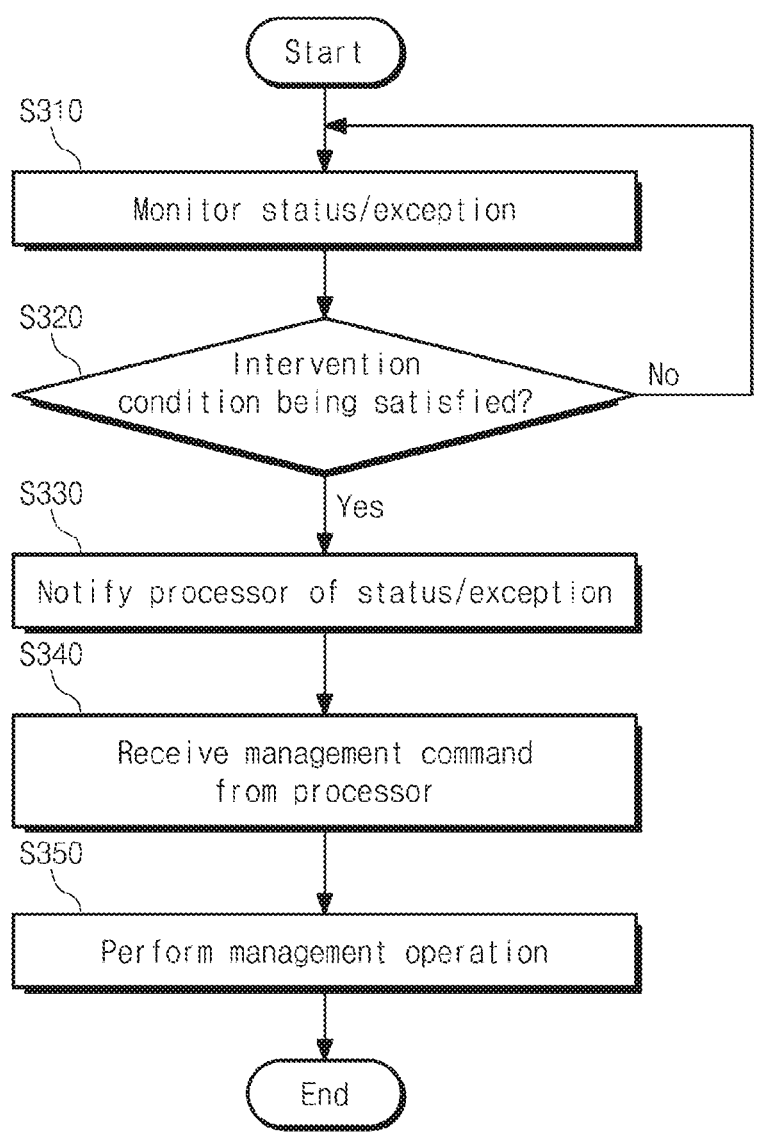
FIG. 15 illustrates a flowchart descriptive of an example management operation which is performed in a storage device of FIG. 2 according to example embodiments of the inventive concept.

FIG. 14 illustrates a block diagram descriptive of an example management operation which is performed in the storage device 1300a of FIG. 2 according to example embodiments of the inventive concept. FIG. 15 illustrates a flowchart descriptive of an example management operation which is performed in the storage device 1300a of FIG. 2 according to example embodiments of the inventive concept. To facilitate better understanding, FIGS. 14 and 15 will be referred to together. In particular, FIG. 14 illustrates the components of the storage device 1300a illustrated and described with respect to FIG. 5, whereby some of the components and details in FIG. 5 may have been excluded from FIG. 14 for the sake of simplicity of illustration.

Referring to FIG. 14, the data domain manager circuit 1337 may monitor a status/exception associated with operations of the one or more memory devices 1310 and the controller 1330a (shown in FIG. 5) (operation S310 of FIG. 15). The data domain manager circuit 1337 may manage an intervention condition for triggering intervention of the processor 1339, based on the monitored status. In some example embodiments, the data domain manager circuit 1337 may include a hardware circuit (e.g., a counter circuit, a latch circuit, and/or the like) to manage the intervention condition.

For example, the data domain manager circuit 1337 may obtain a variety of information from the write manager circuit 1333 and the read manager circuit 1335. The write manager circuit 1333 may provide the packet PCC1 including the information to the data domain manager circuit 1337. The read manager circuit 1335 may provide the packet PCC2 including the information to the data domain manager circuit 1337.

For example, a header portion of the packet PCC1 may include information of a physical address of a memory region occupied by write data as the write data is stored in the one or more memory devices 1310. The data domain manager circuit 1337 may manage an absolute/relative amount of spare regions and/or available regions of the one or more memory devices 1310, based on the packet PCC1. The data domain manager circuit 1337 may manage a wear level of each memory region of the one or more memory devices 1310, based on the packet PCC1. To this end, for example, the data domain manager circuit 1337 may count the amount or the level, by using a counter circuit.

For example, a header portion of the packet PCC2 may include information of a physical address of a memory region accessed as read data is output from the one or more memory devices 1310. For example, the header portion of the packet PCC2 may include information of an error (e.g., parity inconsistency) of the read data, an uncorrectable error correction code (ECC) error, memory fail, and/or the like. The data domain manager circuit 1337 may count the number of accesses to a specific memory region, by using a counter circuit, based on the packet PCC2. The data domain manager circuit 1337 may determine an error of read data, based on the packet PCC2.

Additionally, by using a sensor circuit, the data domain manager circuit 1337 may monitor whether a status of power supplied to the controller 1330a is unstable, or may sense a temperature of a hardware circuit. Accordingly, the data domain manager circuit 1337 may monitor operations which are performed in the storage device 1300a, and may obtain a variety of information associated with an operation status of the storage device 1300a.

The data domain manager circuit 1337 may determine whether the intervention condition for triggering intervention of the processor 1339 is satisfied, based on the obtained information (operation S320 of FIG. 15). The intervention condition may be satisfied when an error or an exception (i.e., an exceptional status) occurs in an operation of the storage device 1300a.

For example, the intervention condition may be satisfied when a count value of the counter circuit becomes greater or smaller than a reference value (e.g., when the amount of spare regions becomes smaller than a reference amount, when the wear level becomes higher than a reference level, and/or the like). For example, the intervention condition may be satisfied when an error or exception associated with the first-type job occurs (e.g., when there is an uncorrectable ECC error in read data). For example, the intervention condition may be satisfied when an abnormal status is observed (e.g., when power supply is unstable, when a temperature of a hardware circuit is excessively high, and/or the like), which may be characterized as an exception (i.e., an exceptional status).

When the intervention condition is not satisfied ("No" of operation S320 of FIG. 15), the data domain manager circuit 1337 may continue to monitor a status of the storage device 1300a (operation S310 of FIG. 15).

On the other hand, when the intervention condition is satisfied ("Yes" of operation S320 of FIG. 15), the data domain manager circuit 1337 may provide a packet PCC3 to the processor 1339 to trigger intervention of the processor 1339. The packet PCC3 may be provided to notify the processor 1339 of information of a status (e.g., a count value, an error, exception, an abnormal status, and/or the like) monitored by the data domain manager circuit 1337 (operation S330 of FIG. 15).

When the packet PCC3 is received, the processor 1339 may output a packet PCC4 to process the second-type job. For example, a header portion of the packet PCC4 may include a management command which directs a management operation to be performed to resolve the status monitored by the data domain manager circuit 1337. The data domain manager circuit 1337 may receive the management command, based on the packet PCC4 received from the processor 1339 (operation S340 of FIG. 15).

The processor 1339 may prepare the management command based on a program code of software and/or firmware. The processor 1339 may store second metadata MD2 in the buffer memory 1350 or may read the second metadata MD2 from the buffer memory 1350, to process the second-type job. For example, the second metadata MD2 may include at least one of information of spare regions and/or available regions of the one or more memory devices 1310, information of wear levels of memory regions of the one or more memory devices 1310, information of the number of read operations performed in memory regions of the one or more memory devices 1310, ECC information used in error detection and correction, and/or the like.

The data domain manager circuit 1337 may perform the management operation directed by the management command (operation S350 of FIG. 15). When the management operation accompanies a write operation and/or a read operation, the data domain manager circuit 1337 may provide a suitable command to the write manager circuit 1333 and/or the read manager circuit 1335.

For example, when the amount of spare regions becomes smaller than a reference amount, the management operation may include garbage collection for securing spare regions. The data domain manager circuit 1337 may provide the memory interface layer 1332 with a packet PCC5 which includes information of an invalidated memory region and a victim memory region and requests the garbage collection. Accordingly, a read operation and a write operation may be accompanied to secure spare regions.

During the garbage collection, data which is read from the one or more memory devices 1310 may be included in a packet PCR6, and then may be provided to the read manager circuit 1335. The read manager circuit 1335 may provide a packet PCW4 including the received data to the write manager circuit 1333. The write manager circuit 1333 may provide the memory interface layer 1332 with a packet PCW5 including the received data. The data may be aligned in a new memory region such that spare regions are secured.

For example, when there is an ECC error in read data, the management operation may include a recovery operation for resolving the error and recovering the read data. The processor 1339 may provide the data domain manager circuit 1337 with metadata which is referenced to recover the read data, through the packet PCC4. The data domain manager circuit 1337 may provide the memory interface layer 1332 with the packet PCC5 including the received metadata. Accordingly, the packet PCR6 including the read data which is recovered based on the metadata may be provided to the read manager circuit 1335.

For example, when a status of power supplied to the controller 1330a is unstable, the management operation may include a flush operation for preserving data buffered in the write manager circuit 1333. The data domain manager circuit 1337 may request the write manager circuit 1333 to flush the data buffered in the write manager circuit 1333 to the one or more memory devices 1310. Accordingly, even though power supply is interrupted, the data buffered in the write manager circuit 1333 may not be lost.

Additionally, various management operations, such as wear leveling, read reclaim, read refresh, bad block management, and/or the like, may be performed according to a manner similar to the above-described manner.

It should be understood that the above examples are provided to facilitate better understanding, and are not intended to limit the inventive concept. The intervention condition and the management operation may be variously changed or modified to process a complex operation and may suitably operate the one or more memory devices 1310 and the controller 1330a, under control of the processor 1339.

Figure 16:
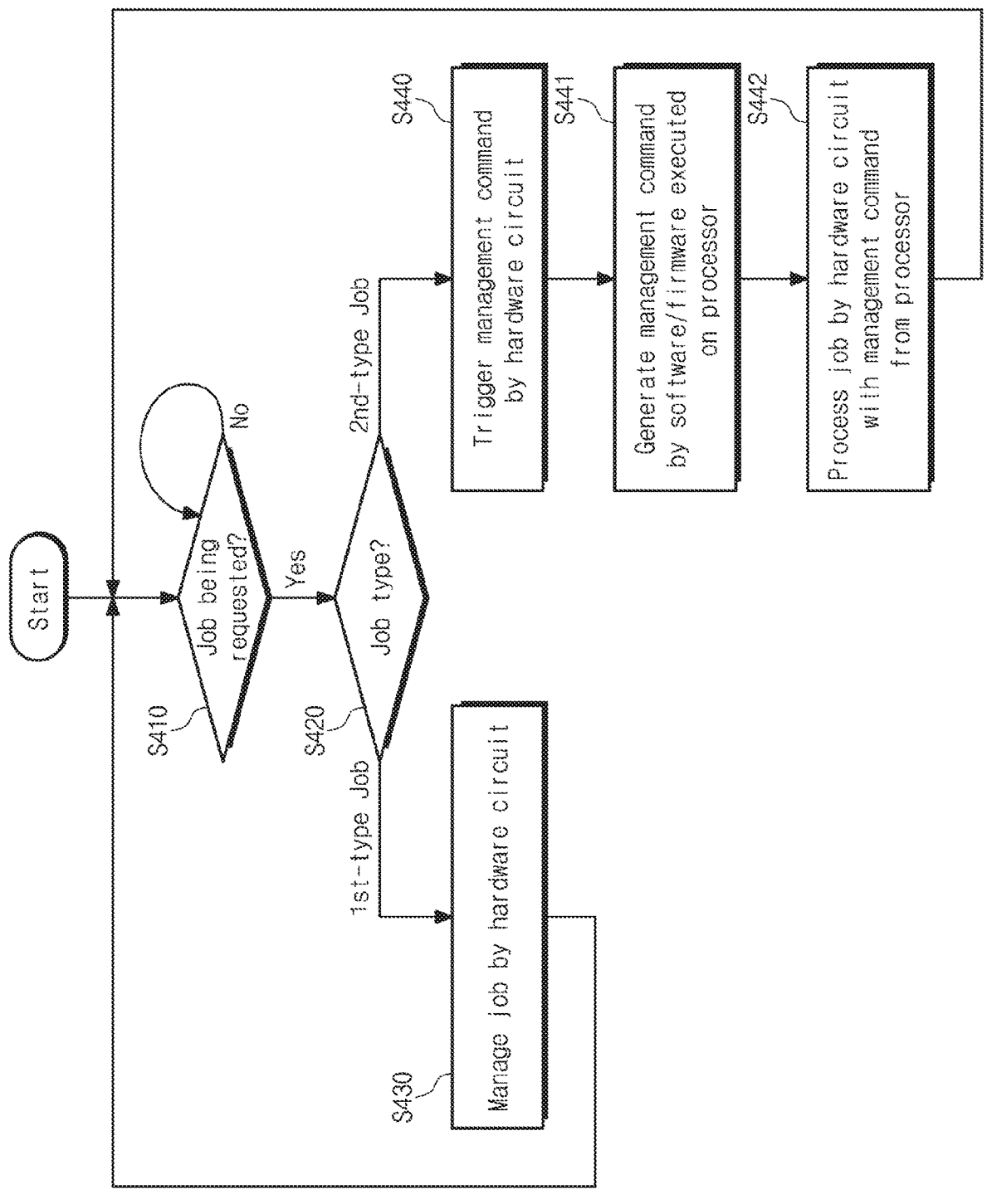
FIG. 16 illustrates a flowchart descriptive of overall operations of a storage device of FIG. 2 according to example embodiments of the inventive concept.

FIG. 16 illustrates a flowchart descriptive of overall operations of the storage device 1300a of FIG. 2 according to example embodiments of the inventive concept.

When a job is not requested with regard to the storage device 1300a ("No" of operation S410), the controller 1330a may wait. On the other hand, when a specific job is requested with regard to the storage device 1300a ("Yes" of operation S410), the controller 1330a may perform an operation required to manage or process the specific job.

In the example embodiments, the requested job may be one of the first-type job and/or the second-type job (operation S420). When the requested job is the first-type job, the requested job may be managed by a hardware circuit (e.g., the first-type job manager circuit HW of FIGS. 3 and 4, and the write manager circuit 1333, the read manager circuit 1335, and the data domain manager circuit 1337 of FIGS. 5 and 17) (operation S430). The processor 1339 (e.g., a program code of software and/or firmware executed on the processor 1339) does not intervene in the first-type job.

When the requested job is the second-type job, the hardware circuit may trigger intervention of the processor 1339 (operation S440). The processor 1339 may prepare a management command based on the program code of software and/or firmware executed on the processor 1339 (operation S441). The hardware circuit may perform the second-type job in response to the management command from the processor 1339 (operation S442). The processor 1339 only intervenes in processing the second-type job.

Meanwhile, in some cases, the first-type job may be managed by the dedicated hardware circuit while the processor 1339 processes the second-type job. That is, the first-type job may be managed concurrently or simultaneously with processing the second-type job, without interruption due to the second-type job. The first-type job may be managed by the dedicated hardware circuit without intervention of the processor 1339, and thus may be handled in parallel with the second-type job.

Figure 17:
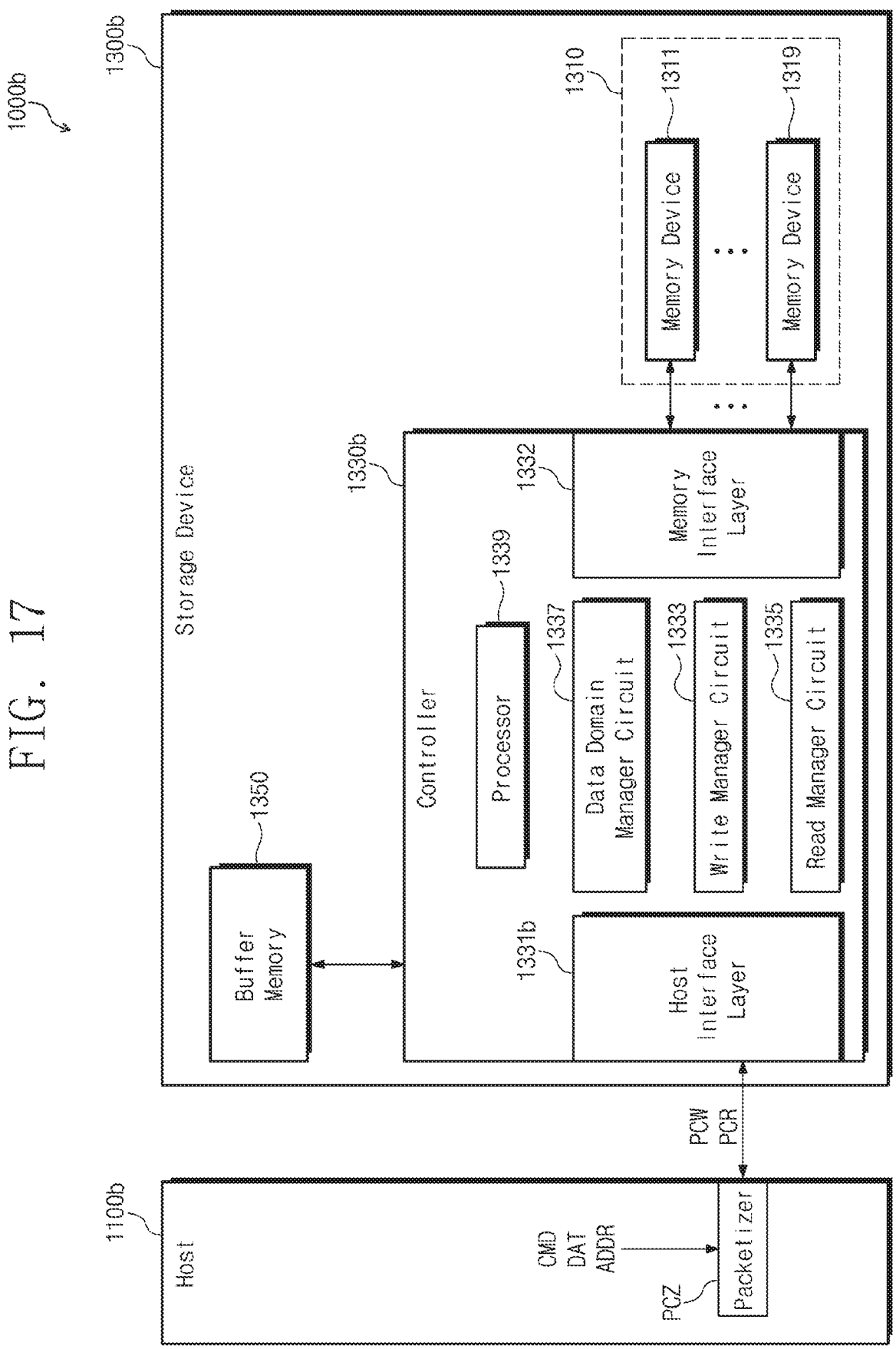
FIG. 17 illustrates a block diagram of an example configuration associated with a storage device of FIG. 1.

FIG. 17 illustrates a block diagram of an example configuration associated with the storage device 1300 of FIG. 1. The electronic system 1000 of FIG. 1 may be embodied as an electronic system 1000b shown in FIG. 17, whereby the storage device 1300 and the main processor 1101 of FIG. 1 are respectively embodied in FIG. 17 as a storage device 1300b and a host 1100b. The electronic system 1000b of FIG. 17 further includes working memory 1200, communication block 1400, user interface 1500 and bus 1600 of FIG. 1, which features have been omitted from FIG. 17 for simplicity.

The storage device 1300b as shown in FIG. 17 includes buffer memory 1350, controller 1330b and the one or more memory devices 1310 including memory devices 1311 and 1319. Controller 1330b includes host interface layer 1331b, memory interface layer 1332, write manager 1333, read manager circuit 1335, data domain manager circuit 1337 and processor 1339. The following description will focus on differences between the components in the electronic system 1000b in FIG. 17 with respect to the components in described with respect to FIGS. 2 and 5 for example. Description of components in FIG. 17 that are configured and function the same as components in FIGS. 2 and 5 will be omitted for brevity.

Comparing FIGS. 2 and 5 to FIG. 17, in example embodiments of the inventive concept, the packetizer PCZ may be included in the host 1100b, instead of in the host interface layer 1331b of the controller 1330b. The packetizer PCZ may generate a packet based on a command CMD, data DAT, and an address ADDR which are generated in the host 1100b. Accordingly, the controller 1330b may exchange a packet PCW or PCR with the host 1100b, and may manage the first-type job based on the packet PCW or PCR.

The above descriptions are intended to provide example configurations and operations for implementing the inventive concept. The scope and spirit of the inventive concept may include implementations which are obtained by simply changing or modifying the above example embodiments, in addition to the above-described example embodiments. Also, the scope and spirit of the inventive concept includes implementations which are accomplished by easily changing or modifying the above-described example embodiments afterwards.

What is claimed is:

1. A storage device comprising:
a nonvolatile memory device;
a buffer memory; and
a controller configured to control the nonvolatile memory device and the buffer memory,
wherein the controller comprising
a processor configured to execute a software code, a host interface layer, a write manager circuit configured to manage a write operation associated with the nonvolatile memory device without intervention of the processor, the write operation including receiving a first write packet associated with the write operation through the host interface layer, buffering first write data included in the first write packet at a first internal buffer of the write manager circuit, allocating a physical address of the nonvolatile memory device for a logical address corresponding to the first write packet, outputting a second write packet including the first write data buffered at the first internal buffer and the allocated physical address, and outputting a third write packet including information of the logical address and the allocated physical address, a data domain manager circuit configured to receive the third write packet from the write manager circuit, and store first meta data in the buffer memory, the first meta data including the information of the logical address and the allocated physical address included in the third write packet, and a memory interface layer configured to receive the second write packet, and control the nonvolatile memory such that the write data is stored in a memory area corresponding to the allocated physical address, and wherein when a garbage collection on the nonvolatile memory device is required, the data domain manager circuit and the write manager circuit perform the garbage collection in response to a first control packet from the processor executing the software code.

2. The storage device of claim 1, wherein the host interface layer comprises a packetizer configured to combine a write command, the first write data, and additional information to generate the first write packet, the additional information including at least one of a destination of the first write packet, an address, and an error check bit.

3. The storage device of claim 2, wherein the controller further comprises:

a read manager circuit configured to manage a read operation associated with the nonvolatile memory device without the intervention of the processor.

4. The storage device of claim 3, wherein the write manager circuit comprise a buffer manager configured to manage allocation of the first internal buffer.

5. The storage device of claim 4, wherein the write manager circuit is further configured to receive a first read packet from the host interface layer, and transfer the first read packet to the data domain manager circuit in a case where the buffer manager determines read data corresponding to the first read packet is not in the first internal buffer, the data domain manager circuit is further configured to obtain a physical address corresponding to the first read packet based on meta data in the buffer memory, and output a second read packet including the physical address corresponding to the first read packet, the memory interface layer is further configured to receive the second read packet, control the nonvolatile memory device to read first read data from the physical address corresponding to the first read packet, and output a third read packet including the first read data, the read manager circuit is further configured to receive the third read packet, buffer the first read data at a second internal buffer of the read manager circuit, and output a fourth read packet including the first read data buffered at the second internal buffer, and the host interface layer is further configured to receive the fourth read packet, and output the first read data based on the fourth read packet.

6. The storage device of claim 4, wherein the write manager circuit is further configured to receive a first read packet from the host interface layer, and transfer a fifth read packet including first read data, corresponding to the first read packet, to the read manager circuit in a case where the buffer manager determines the first read data is in the first internal buffer, the read manager circuit is further configured to receive the fifth read packet, and output a sixth read packet including the first read data, and the host interface layer is further configured to receive the sixth read packet, and output the first read data based on the sixth read packet.

7. The storage device of claim 3, wherein data domain manager circuit is further configured to output a second control packet based on a third control packet from the write manager circuit, the third control packet including information associated with a data size, and the processor is further configured to output the first control packet in response to the third control packet from the data domain manager circuit.

8. The storage device of claim 7, wherein the processor outputs the first control packet based on second meta data stored in the buffer memory, and the second meta data comprises at least one of information of spare regions and/or available regions of the nonvolatile memory device, information of wear levels of memory regions of the nonvolatile memory device, information of a number of read operations performed in the memory regions of the nonvolatile memory device, and error correction code (ECC) information used in error detection and correction.

9. The storage device of claim 7, wherein the data domain manager circuit is further configured to output a fourth control packet to the memory interface layer in response to the first control packet, the fourth control packet including information associated with a victim memory block of the nonvolatile memory device.

10. The storage device of claim 9, wherein the memory interface layer is further configured to read data for the garbage collection from the victim memory block in response to the fourth control packet, and output a first read packet including the data for the garbage collection.

11. The storage device of claim 10, wherein the read manager circuit is further configured to output a fourth write packet including the data for the garbage collection in response to the first read packet.

12. The storage device of claim 11, wherein the write manager circuit is further configured to output a fifth write packet including the data for the garbage collection in response to the fourth write packet.

13. The storage device of claim 12, wherein the memory interface layer is further configured to control the nonvolatile memory device such that the data for the garbage collection is stored in a memory block of the nonvolatile memory device other then the victim memory block.

14. The storage device of claim 3, wherein the data domain manager circuit is further configured to output a second control packet based on a third control packet from the read manager circuit, the third control packet including information associated with an error of read data, and the processor is further configured to output a fourth control packet in response to the third control packet from the data domain manager circuit, the fourth control packet including information associated with metadata which is referenced to recover the error of the read data.

15. The storage device of claim 14, wherein the data domain manager circuit is further configured to output a fifth control packet in response to the fourth control packet, the fifth control packet including the information associated with metadata.

16. The storage device of claim 15, wherein the memory interface layer is further configured to read data from the nonvolatile memory device, recover an error of the read data from the nonvolatile memory device based on the metadata included in the fifth control packet to provide recovered read data, and output a first read packet including the recovered read data.

17. The storage device of claim 1, wherein the processor is further configured to execute a management operation including at least one of a wear leveling operation, a read refresh operation, a error detection and correction operation, and a power failure protection operation on the nonvolatile memory device, by executing the software code.

18. A storage device comprising: a nonvolatile memory device;
a buffer memory; and
a controller configured to control the nonvolatile memory device and the buffer memory,
wherein the controller comprises a processor configured to execute a software code, a host interface layer configured to output a first write packet in response to a write request from an external host, and output a first read packet in response to a read request from the external host,
a write manager circuit configured to, without intervention of the processor, manage the write operation responsive to the first write packet received from the host interface layer, output a second write packet and a third write packet in response to the first write packet from the host interface layer, and output a second read packet in response to the first read packet from the host interface layer,
the managed write operation including buffering first write data associated with the write request at a first internal buffer and allocating a physical address of the nonvolatile memory for the logical address corresponding to the first write packet,
wherein the second write packet includes the first write data buffered at the first internal buffer and the allocated physical address; and the third write packet includes information of the logical address and the physical address,
a data domain manager circuit configured to, without the intervention of the processor, store first metadata in the buffer memory in response to the third write packet, and output a third read packet in response to the second read packet,
a memory interface layer configured to store first write data corresponding to the write request in the nonvolatile memory device in response to the second write packet, and output the third read packet in response to the second read packet, and
a read manager circuit configured to, without the intervention of the processor, output a fourth read packet including first read data corresponding to the read request in response to the third read packet,
wherein when a garbage collection on the nonvolatile memory device is required, the data domain manager circuit, the write manager circuit, and the read manager circuit perform the garbage collection in response to a first control packet from the processor executing the software code.

19. The storage device of claim 18, wherein the write manager circuit comprises:
a first internal buffer configured to buffer data to be stored in the nonvolatile memory device; and
a buffer manager configured to manage allocation of the first internal buffer,
wherein when the buffer manager determines the first read data is in the first internal buffer, the write manager circuit outputs a fifth read packet including the first read data, instead of the second read packet, and
the read manager circuit outputs a sixth read packet including the first read data in response to the fifth read packet.

20. The storage device of claim 19, wherein the processor is further configured to execute a management operation including at least one of a wear leveling operation, a read refresh operation, a error detection and correction operation, and a power failure protection operation on the nonvolatile memory device, by executing the software code.

* * * * *